INFORMATION STORAGE AND RETRIEVAL

Filed Sept. 18, 1962 15 Sheets-Sheet 1

INVENTOR.
EUGENE H. IRASEK
BY
Samuel Cohen
Attorney

July 23, 1968 E. H. IRASEK 3,394,247

INFORMATION STORAGE AND RETRIEVAL

Filed Sept. 18, 1962 15 Sheets-Sheet 2

INVENTOR.
EUGENE H. IRASEK
BY
Samuel Cohen
Attorney

INFORMATION STORAGE AND RETRIEVAL

Filed Sept. 18, 1962 15 Sheets-Sheet 3

INVENTOR.
EUGENE H. IRASEK
BY
Samuel Cohen
Attorney

INFORMATION STORAGE AND RETRIEVAL

Filed Sept. 18, 1962 15 Sheets-Sheet 4

INVENTOR
EUGENE H. IRASEK
BY
Samuel Cohen
Attorney

INVENTOR
EUGENE H. IRASEK
BY Samuel Cohen
Attorney

INFORMATION STORAGE AND RETRIEVAL

Filed Sept. 18, 1962 15 Sheets-Sheet 6

INVENTOR.
EUGENE H. IRASEK
BY
Samuel Cohen
Attorney

INFORMATION STORAGE AND RETRIEVAL

Filed Sept. 18, 1962 15 Sheets-Sheet 7

INVENTOR
EUGENE H. IRASEK
BY
Samuel Cohen
Attorney

INVENTOR.
EUGENE H. IRASEK
BY
Samuel Cohen
Attorney

INVENTOR.
EUGENE H. IRASEK
BY [signature]
ATTORNEY

INVENTOR.
EUGENE H. IRASEK
BY
[signature]
ATTORNEY

INVENTOR.
EUGENE H. IRASEK
BY Samuel Cohen
ATTORNEY

INVENTOR.
EUGENE H. IRASEK
BY [signature]
ATTORNEY

INVENTOR
EUGENE H. IRASEK
BY
Samuel Cohen
ATTORNEY

INFORMATION STORAGE AND RETRIEVAL

Filed Sept. 18, 1962 15 Sheets-Sheet 14

INVENTOR.
EUGENE H. IRASEK
BY
ATTORNEY

INVENTOR.
EUGENE H. IRASEK
BY
ATTORNEY

United States Patent Office 3,394,247

Patented July 23, 1968

3,394,247
INFORMATION STORAGE AND RETRIEVAL

Eugene H. Irasek, Pacoima, Calif., assignor to Radio Corporation of America, a corporation of Delaware Filed Sept. 18, 1962, Ser. No. 224,420
43 Claims. (Cl. 235—61.11)

The present invention relates to information storage and retrieval.

An object of the invention is to provide an open-ended information storage and retrieval system, that is, one which can easily be expanded.

Another object of the invention is to provide an information storage and retrieval system, which is capable of handling digital (binary) and/or analog (video), and/or pictorial (such as microfilm) information.

Another object of the invention is to provide an information storage and retrieval system in which the cost per unit of information stored is relatively low.

Another object of the invention is to provide information storage and retrieval system which has a relatively low access time—less than 200 milliseconds.

Another object of the invention is to provide, in an information storage and retrieval system which includes magazines for storing cards, new and improved apparatus for dislodging a desired card from a magazine.

Another object of the invention is to provide new and improved apparatus for reading and recording digital and analog (video) information on a card.

The system of the invention includes a plurality of magazines, each storing a plurality of cards. There is a card selection system which may be common to all magazines for selecting any card in any magazine. The system also includes a card transport system which is common to all magazines. The card transport system moves the card selected to a station at which information may be read from and/or written on the card and then may return the card to the magazine from which it was selected or may recirculate the card through the read/write station.

The system of the invention is capable of handling digital, analog and pictorial information. The digital and analog information is stored in magnetic form. The pictorial information is stored as a transparency analogous to the storage of information on a microfilm. There are separate read/write stations for the digital and analog information. There is also a separate station for projecting pictorial information stored on a card onto a screen for viewing, and for reproducing the pictorial information, if desired. The card transport system is common to all of the stations and moves the card selected from the magazine to the appropriate station for reading and/or writing information on the card.

The invention is discussed in greater detail below and is illustrated in the following drawings of which:

Figures 7A, 7C:
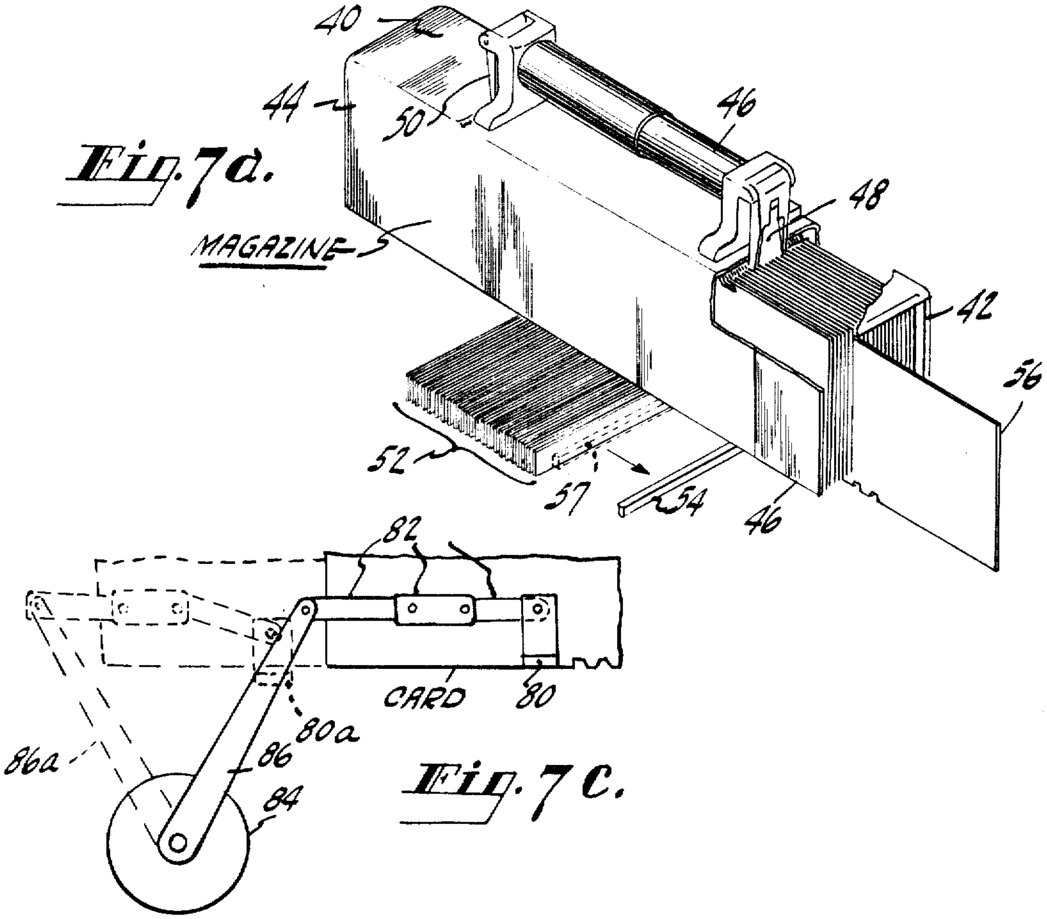
Figure 7B:
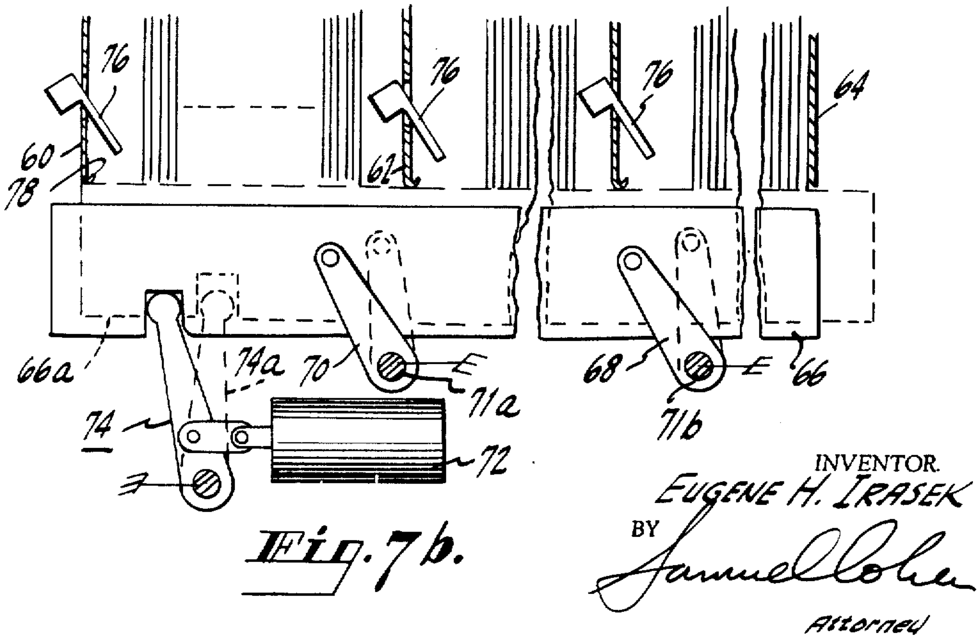
Figure 11:
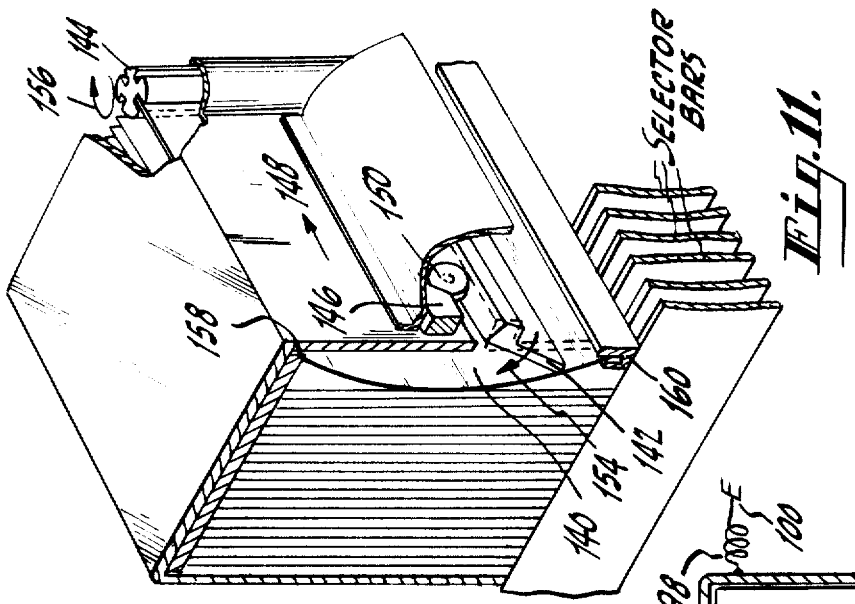
Figure 9:
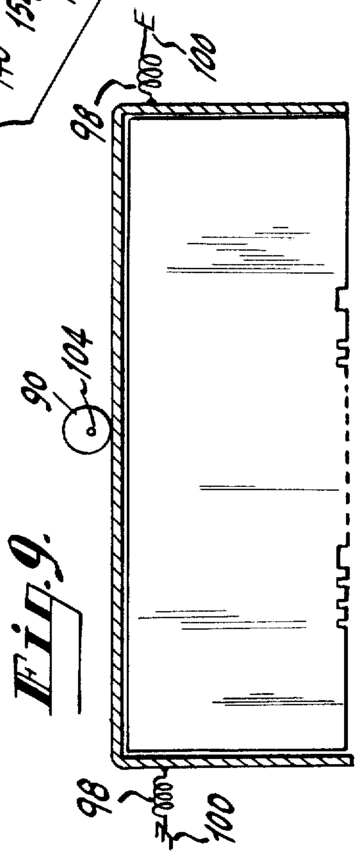
Figure 8:
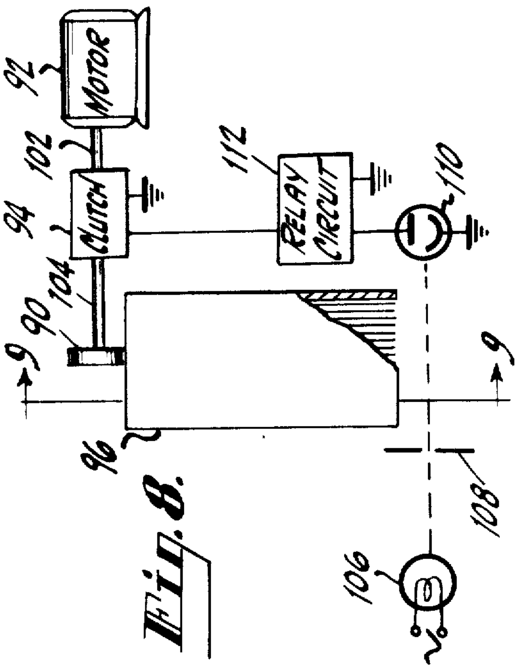
Figures 12B, 12C, 12D:
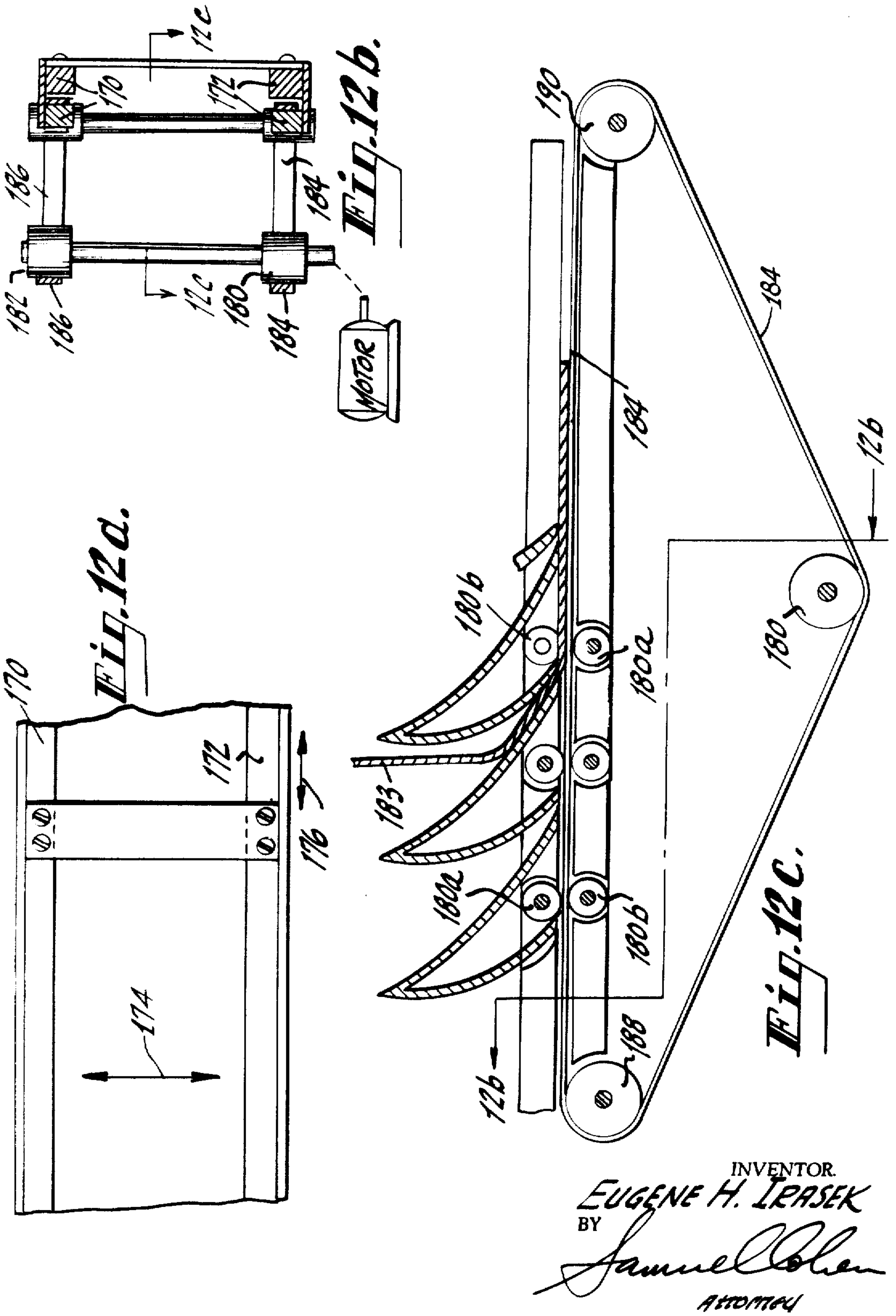
Figure 13:
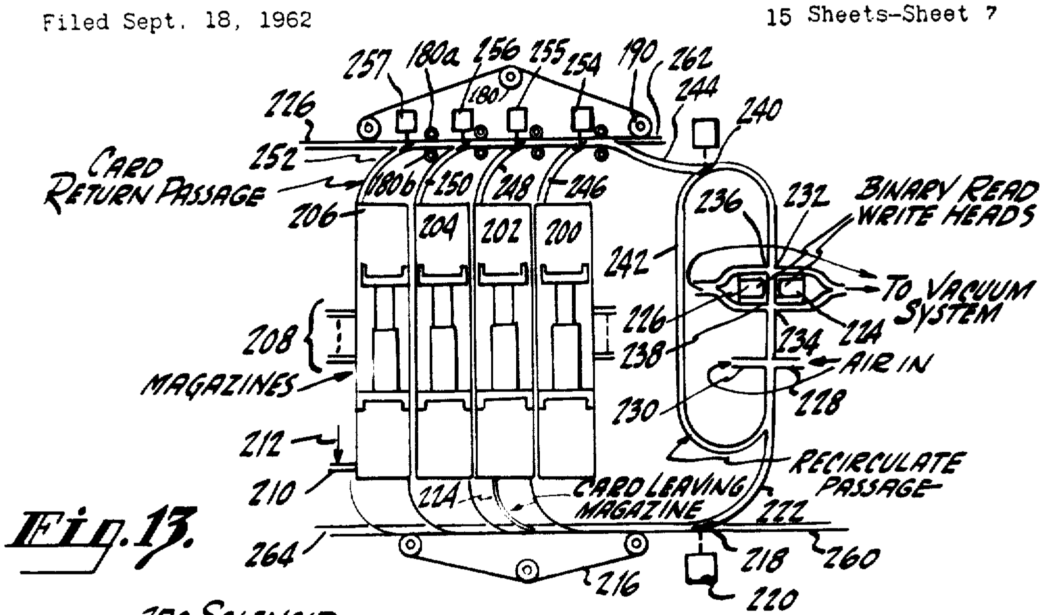
Figure 14A:
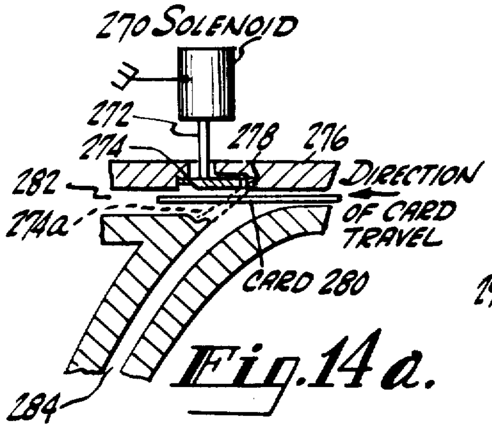
Figure 14B:
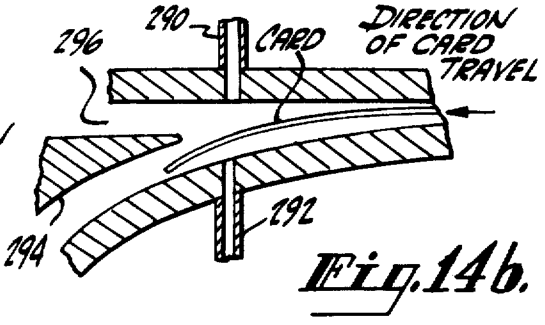
Figure 15A:
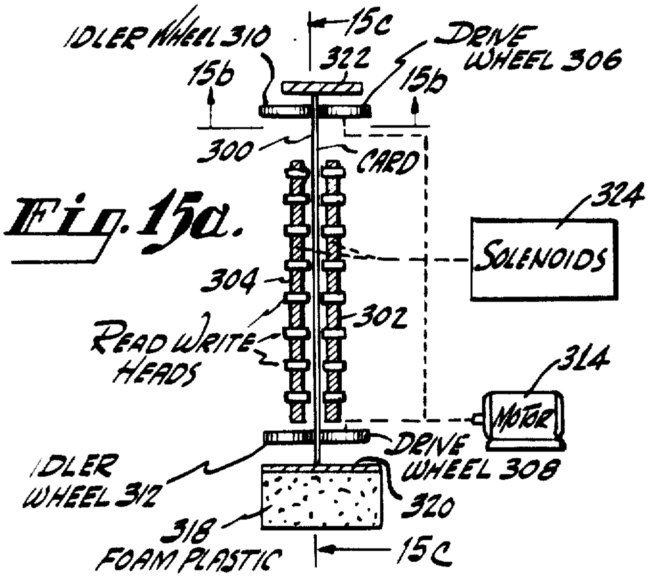
Figure 15B:
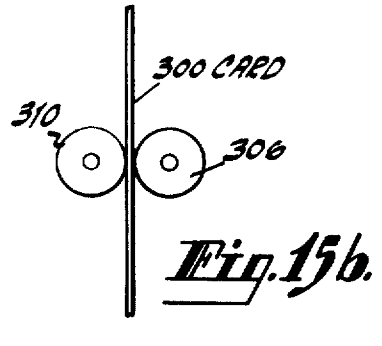
Figure 15C:
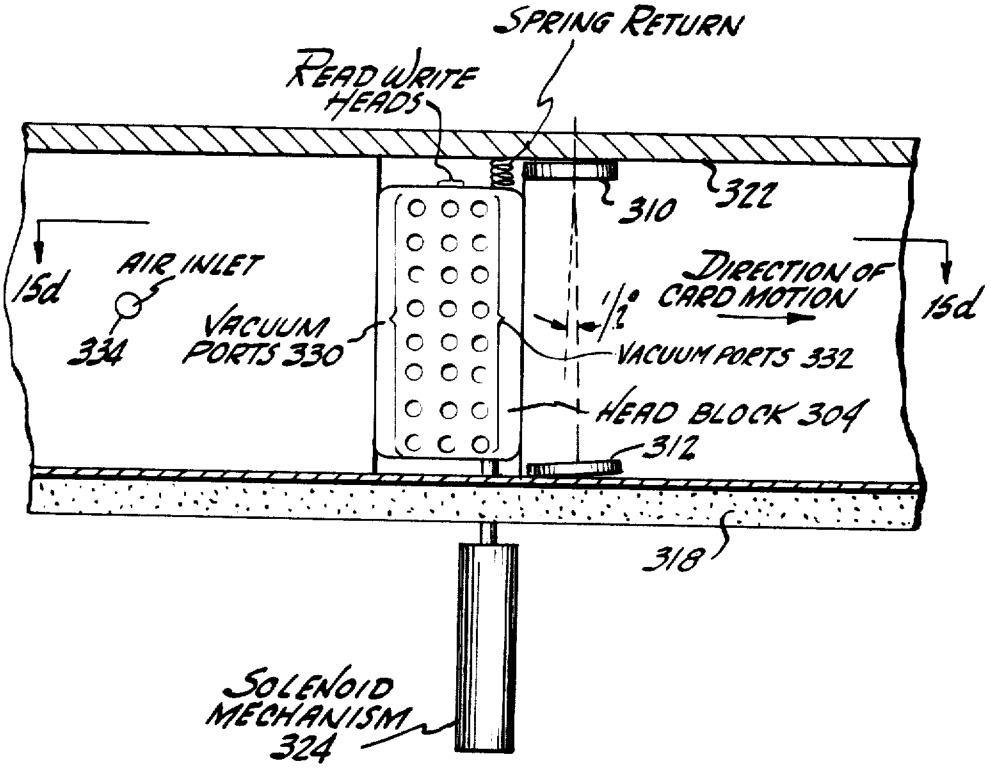
Figure 15D:
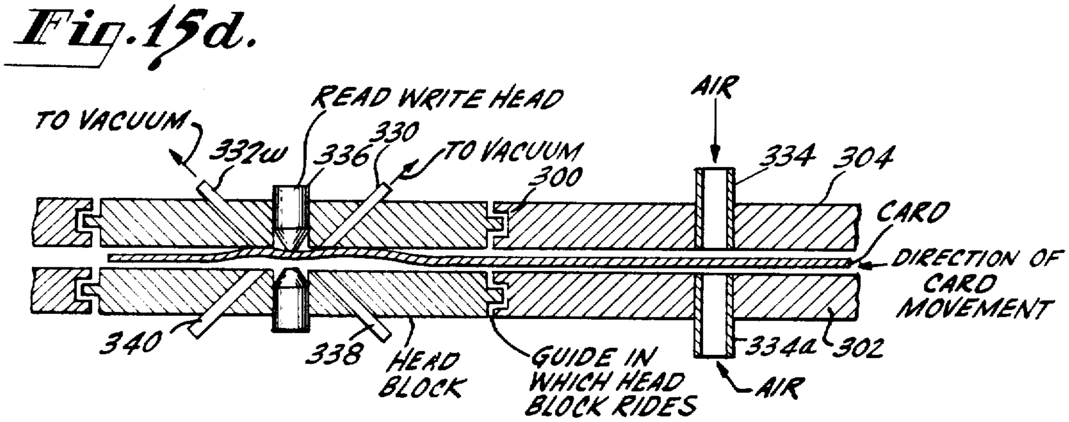
Figures 16A, 16B:
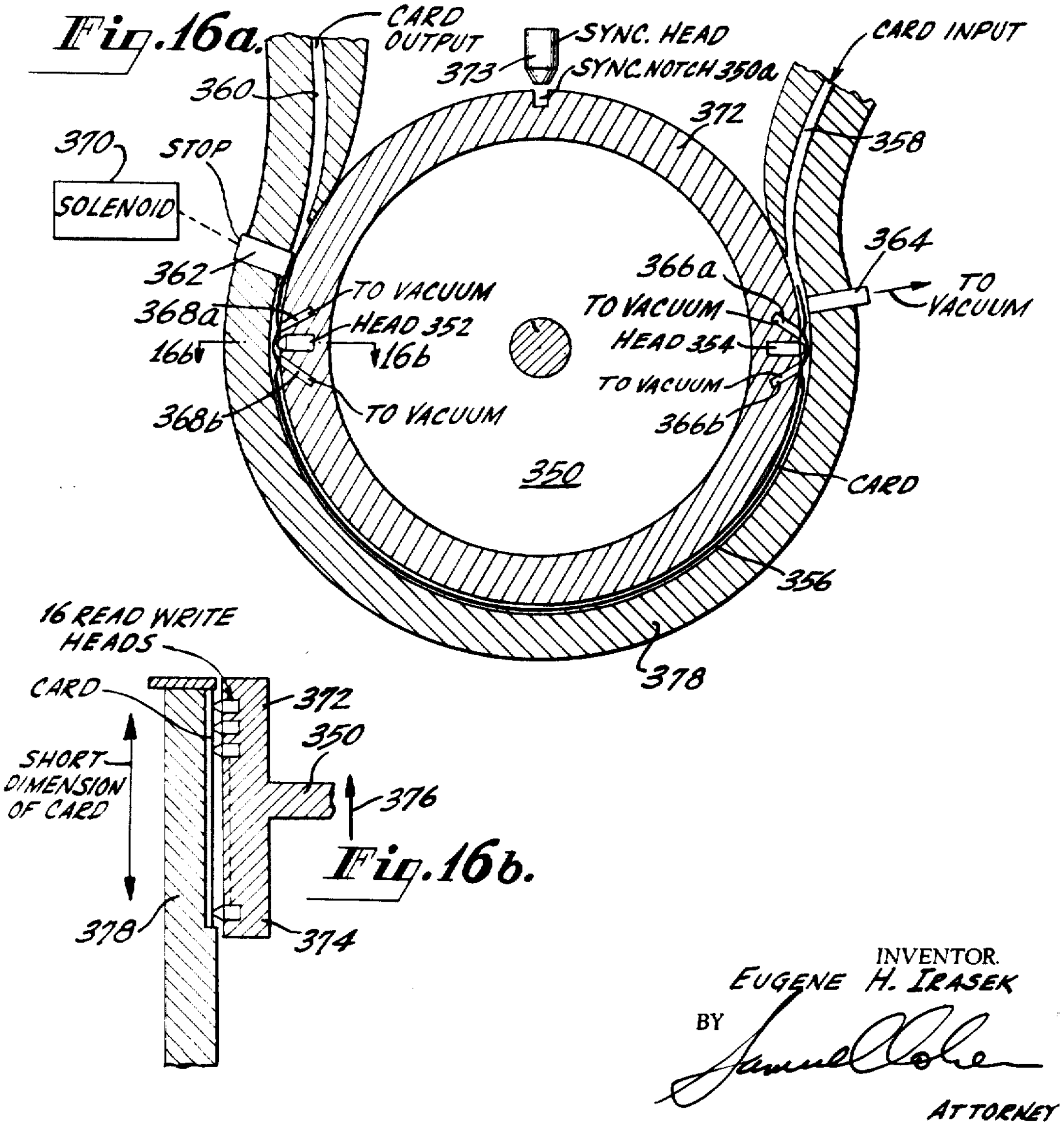
Figure 17A:
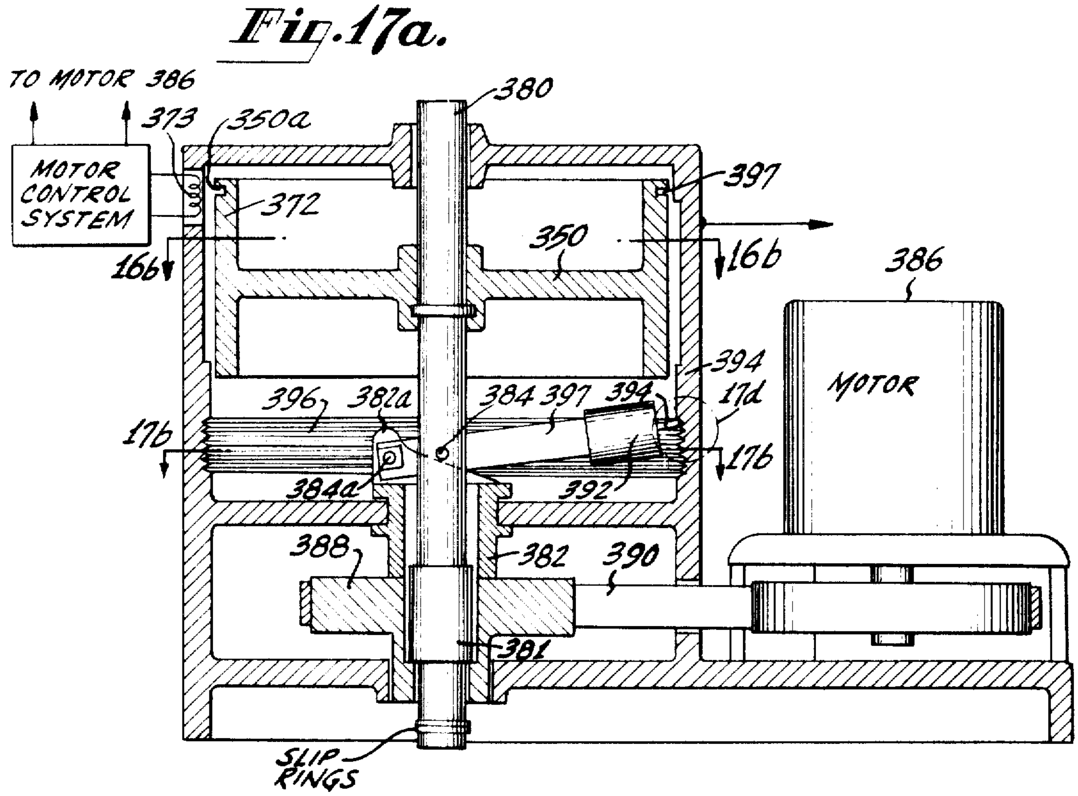
Figures 17B, 17C, 17D:
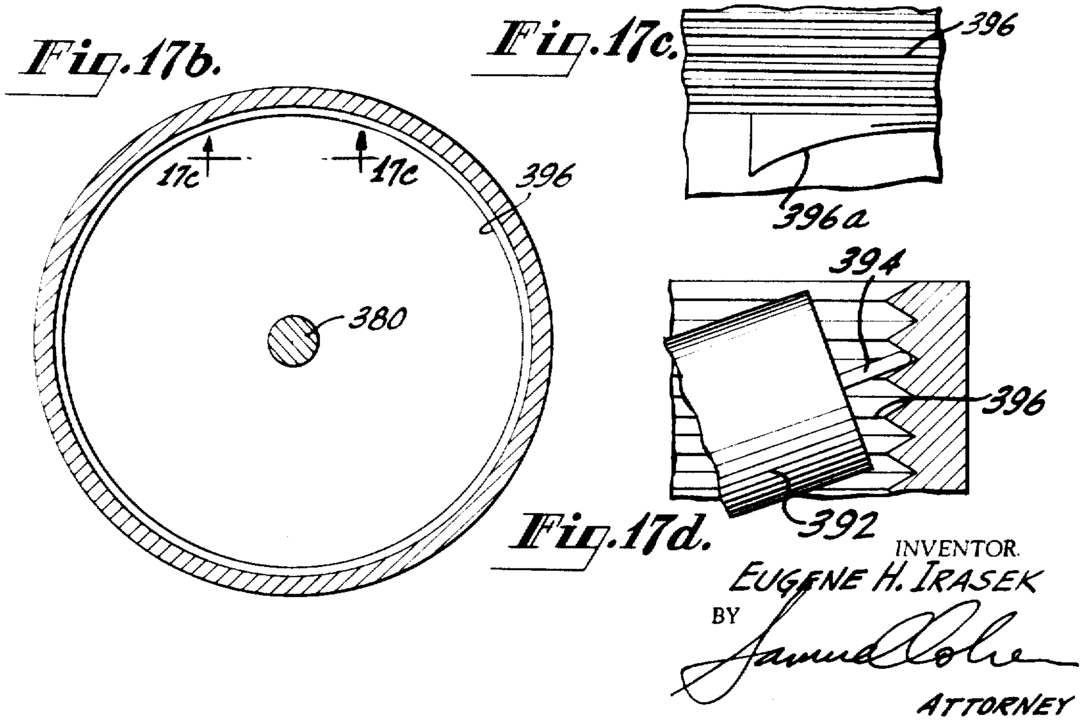
Figures 17E, 17F, 18A:
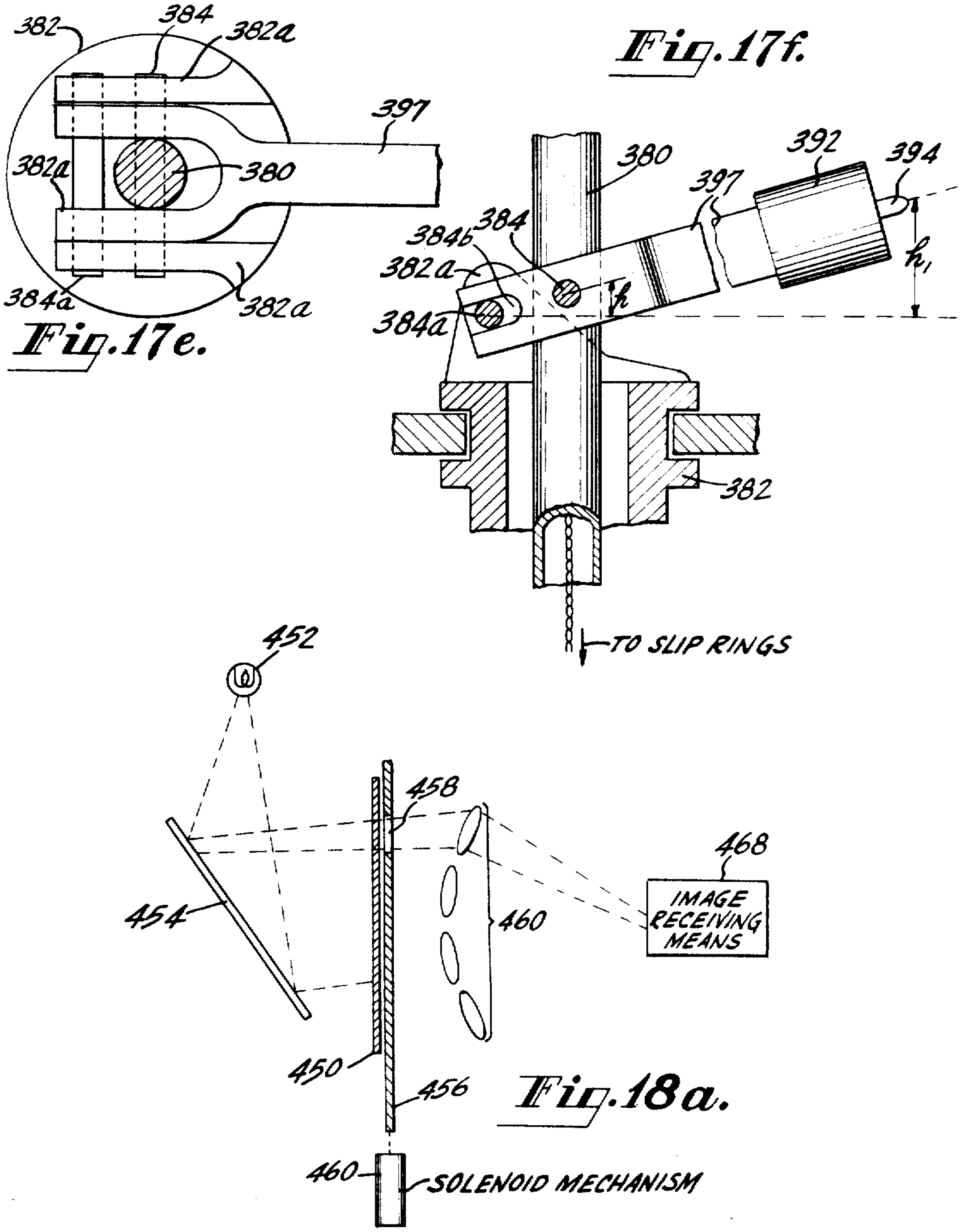
Figure 18B:
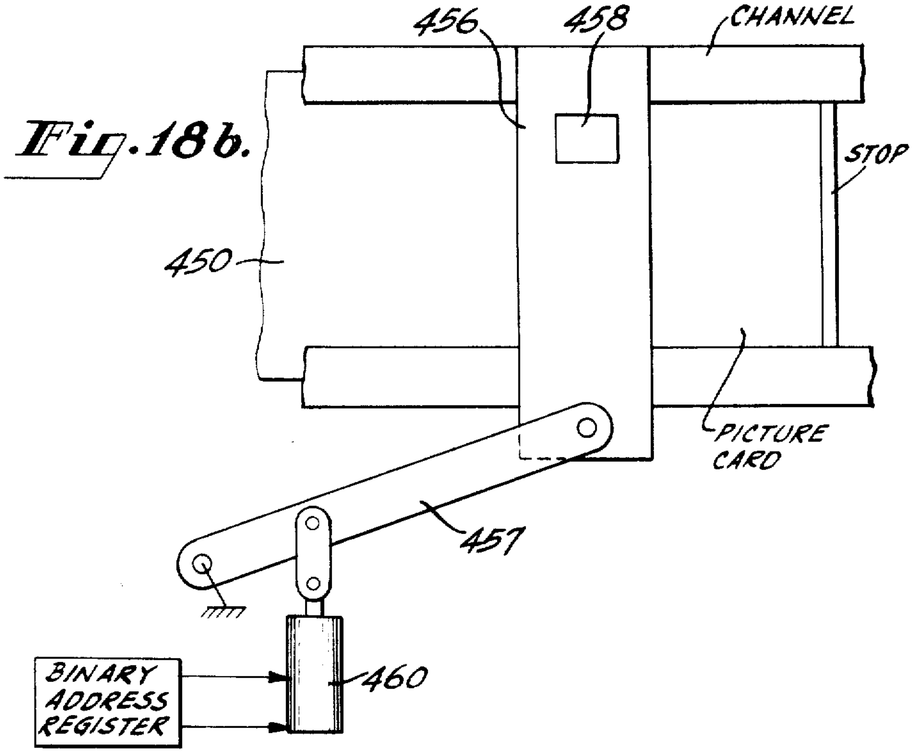
Figure 18C:
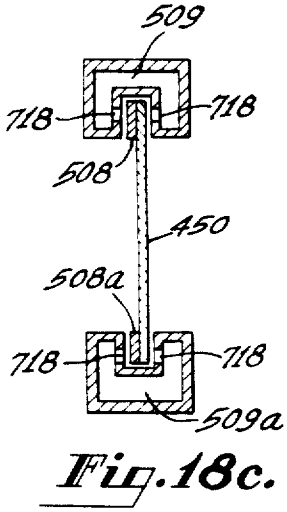
Figure 18D:
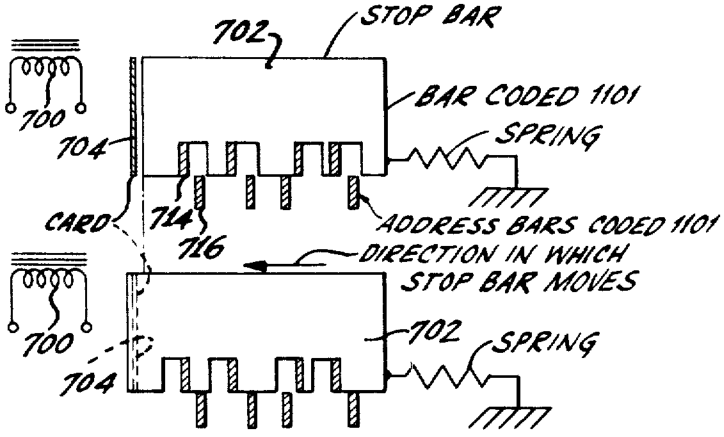
Figures 18E, 18F:
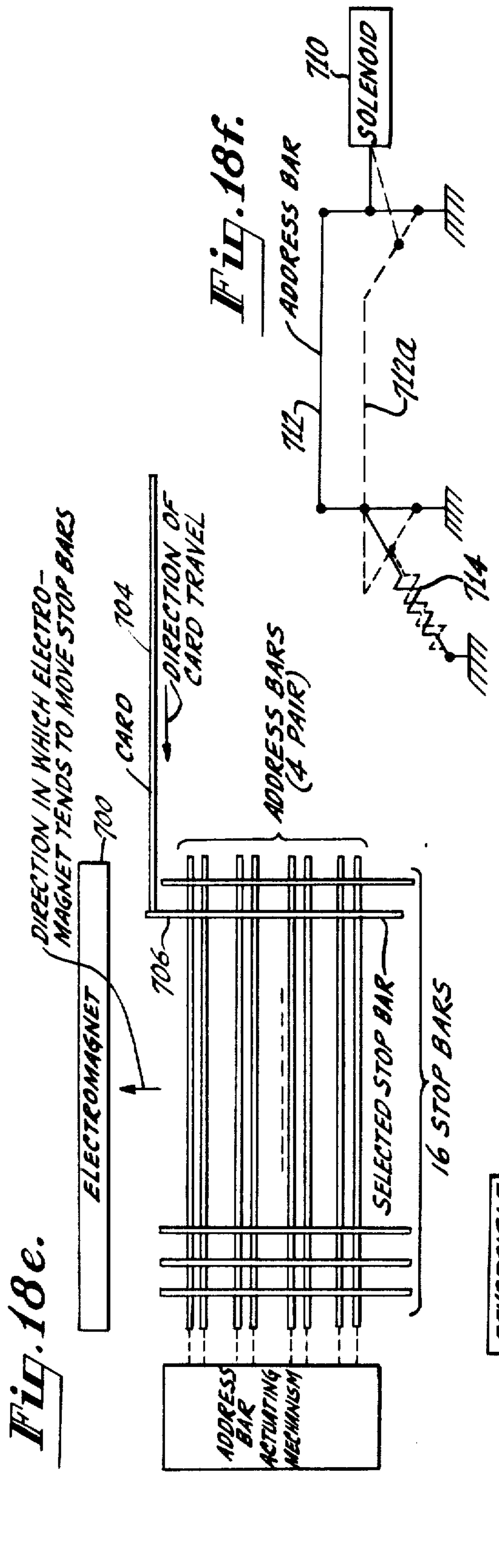
Figure 18G:
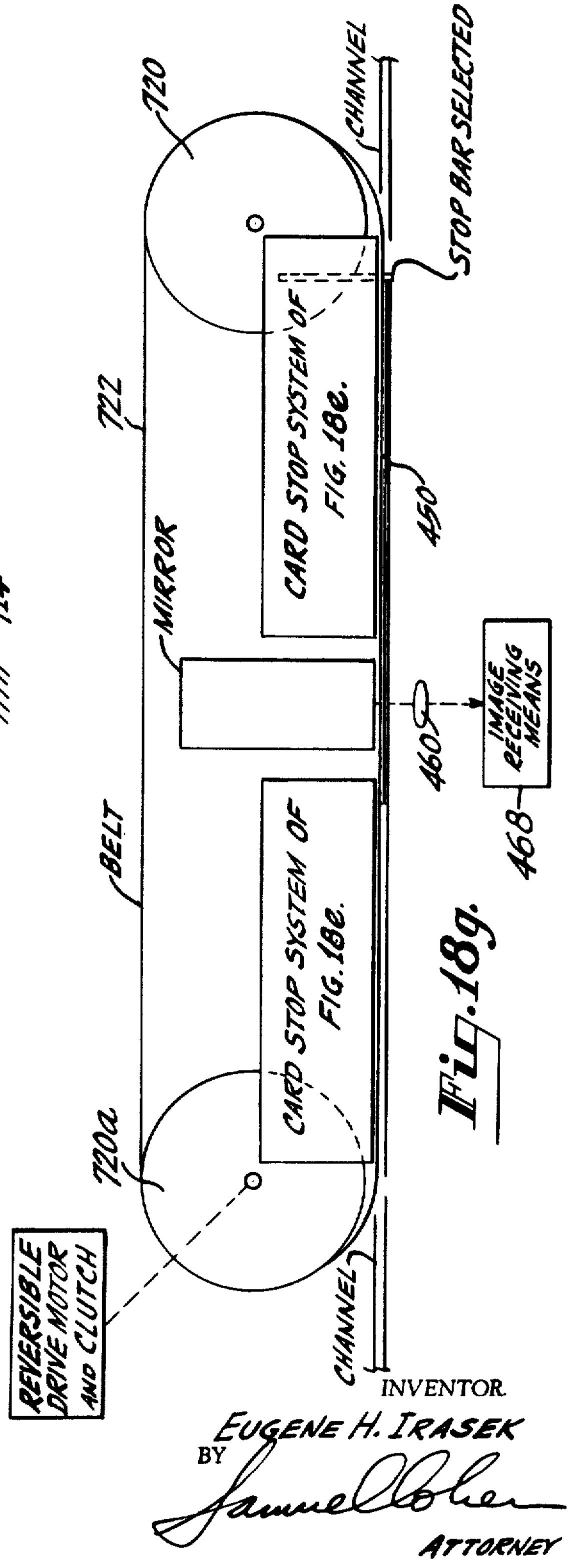
Figures 19, 20:
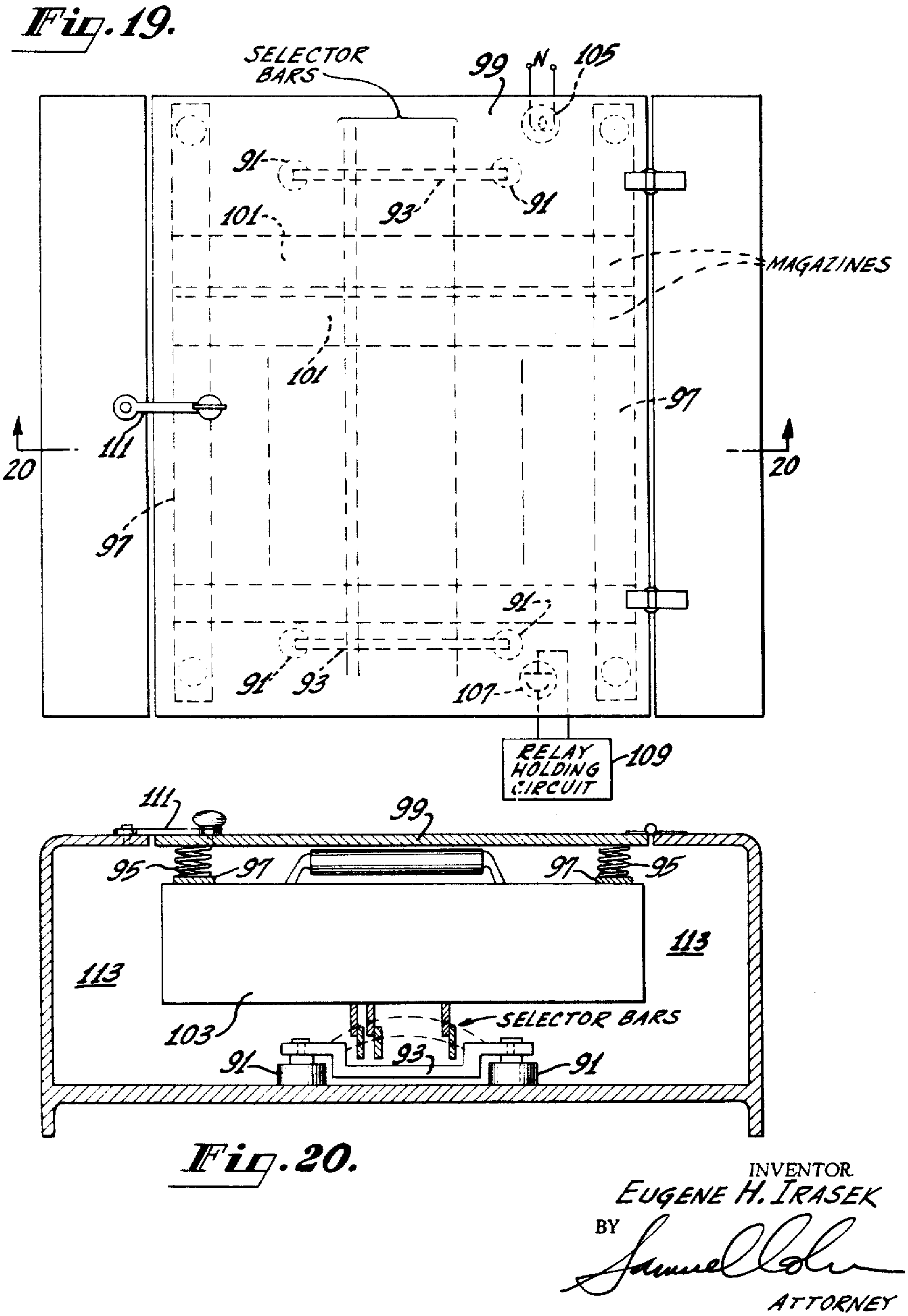

FIGS. 4, 5 and 6*a*, 6*b* illustrate the cards for storing binary, analog and pictorial information, respectively;

FIG. 7*a* is a perspective, partially cut away view of a magazine storing cards;

FIG. 7*b* is a showing of the mechanism for moving the card selector bars into and out of an operative position with respect to the magazines;

FIG. 7*c* is a view showing details of the card ejecting mechanism;

FIG. 8 is a schematic showing of a system for dislodging cards from a magazine;

FIG. 9 is a cross-section along line 9—9 of FIG. 8;

FIGS. 10*a*–10*d* are schematic showings of the steps in selecting and then withdrawing a card from the magazine;

FIG. 11 is a partially cut-away, perspective view of a card magazine showing the arrangement for returning the card to the magazine;

FIG. 12*a* is a schematic showing of a passage or race through which the card selected moves;

FIG. 12*b* is a cross-section along line **12*b*—12*b*** of FIG. 12*a*;

FIG. 12*c* is a cross-section along line **12*c*—12*c*** of FIG. 12*b* showing the card driving mechanism;

FIG. 13 is a schematic showing of several card magazines, the card transport mechanism for the magazines, and a binary read/write station;

FIGS. 14*a* and 14*b* are cross-sectional views showing alternative ways in which a card in the card transport system may be directed along a desired path;

FIG. 15*a* is a cross-section through a binary read/write station;

FIG. 15*b* is a cross-section along lines **15*b*—15*b*** of FIG. 15*a*;

FIG. 15*c* is a cross-sectional view along lines **15*c*—15*c*** of FIG. 15*a*;

FIG. 15*d* is a cross-sectional view along line **15*d*—15*d*** of FIG. 15*c*;

FIG. 16*a* is a cross-sectional view of an analog read/write station;

FIG. 16*b* is a cross-sectional view along lines **16*b*—16*b*** of FIG. 16*a*;

FIG. 17*a* is a view, partially in cross-section, of the headwheel drive and headwheel positioning system for the analog read/write station;

FIGS. 17*b*–17*f* are sectional views showing details of FIG. 17*a*;

FIG. 18*a* is a cross-sectional view through a portion of the pictorial read and reproduction station;

FIG. 18*b* is a plan view of a portion of the pictorial read and reproduction station;

FIG. 18*c* is a sectional view through the transport system at the pictorial read and reproduction station;

FIGS. 18*d*, 18*e* and 18*f* show details of the system for moving a desired stop bar into position in the pictorial read and reproduction station;

FIG. 18*g* is a schematic showing of the entire pictorial read and reproduction station;

FIG. 19 is a plan view of an alternate system for dislodging a card from the card magazine;

FIG. 20 is a sectional view along line 20—20 of FIG. 19; and

Figure 21:
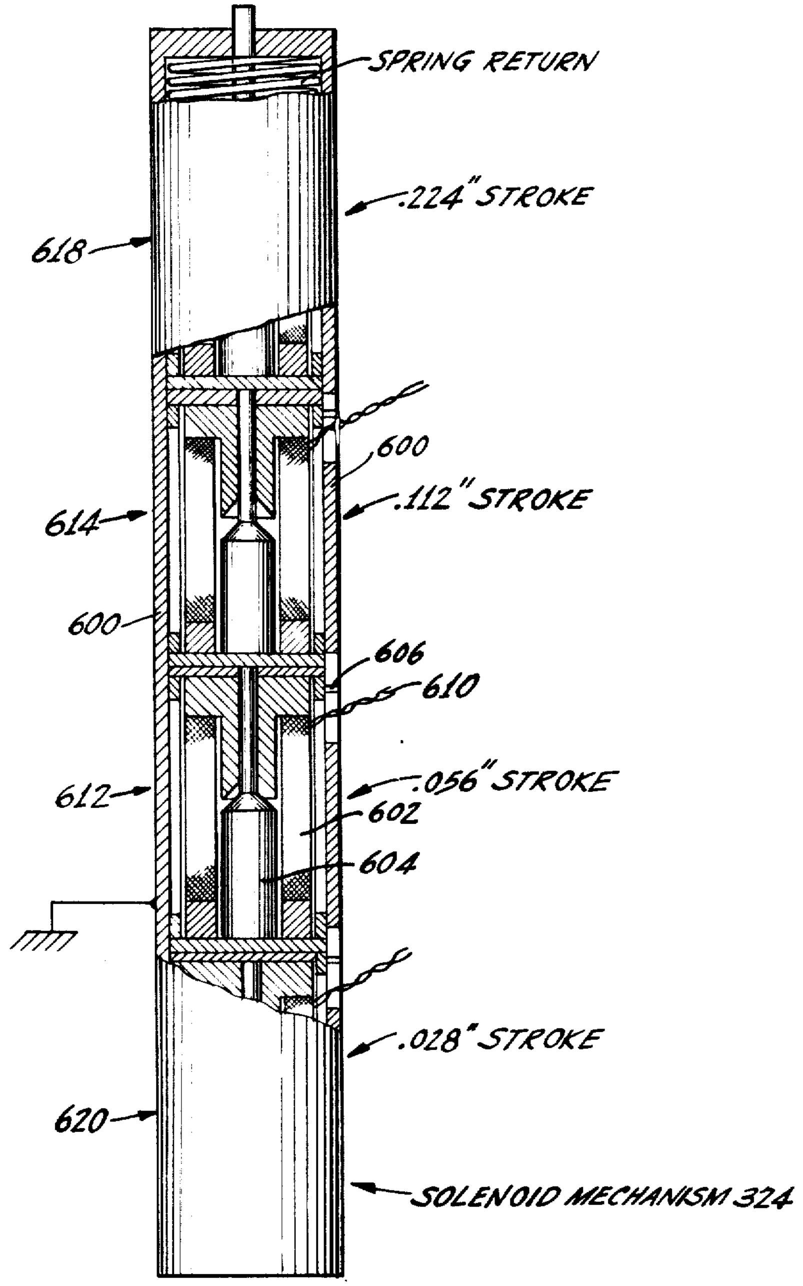

FIG. 21 is a view, partially in cross-section, showing details of the solenoid mechanism of FIG. 15*c*.

Figure 1:
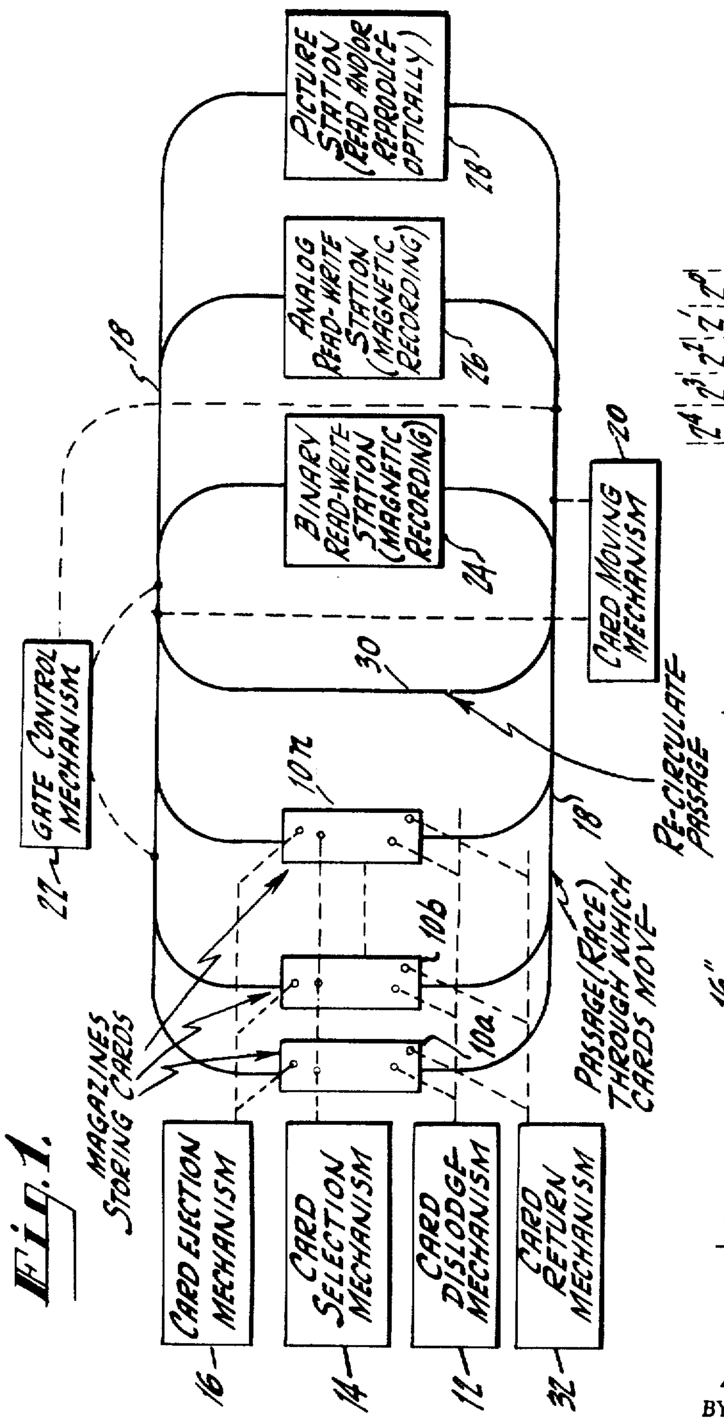
FIG. 1 is a schematic showing of an information storage and retrieval system according to the invention.

The system shown in FIG. 1 includes a plurality of magazines **10*a*, 10*b* . . . 10*n*, each of which stores a plurality of cards. The card dislodge mechanism 12 which is coupled to all magazines is for the purpose of dislodging the card selected from its magazine. In this figure and in a number of the other figures which follow, a mechanical coupling is indicated by a dashed line. The purpose of the card selection mechanism 14 is to select the card desired from all of the magazines. The card ejection mechanism 16** removes the card which has been selected and dislodged, from the magazine and places it in the transport passage (race).

The race 18 is illustrated in FIG. 1 by solid lines. A more detailed showing appears later in FIGS. 12–12*c*. The card is moved in the race 18 by a card moving mechanism 20. This includes belts which engage the card as it moves along the race and, in some instances, rollers which engage and drive the card.

The path taken by the card is controlled by the gate control mechanism 22. It causes certain paths to open and others to close. Details of alternate forms of gate mechanisms which may be employed appear in FIGS. 14*a* and 14*b* and are discussed later.

The system of FIG. 1 is capable of storing three types of information, namely binary, analog and picture information. A card storing binary information is directed to the binary read/write station 24. A card storing analog information is directed to the analog read/write station 26. A card storing pictorial information is directed to the picture station 28. It may require several passes of the card through the station to which it is directed before all of the information is read or written from the card. The card may be returned directly to its station after each pass via a recirculate passage 30. For purposes of illustration, only one such recirculate passage 30 is shown in FIG. 1. However, in practice, it may be desirable that each read/write station have its own recirculate passage. This may be preferable as the recirculate passage can then be located closer to its station and card travel time lessened.

After the information has been read from or written onto a card, it is returned to its magazine. The return of the card to the magazine is controlled by the gate control mechanism 22 and the card return mechanism 32.

Figures 2, 3:
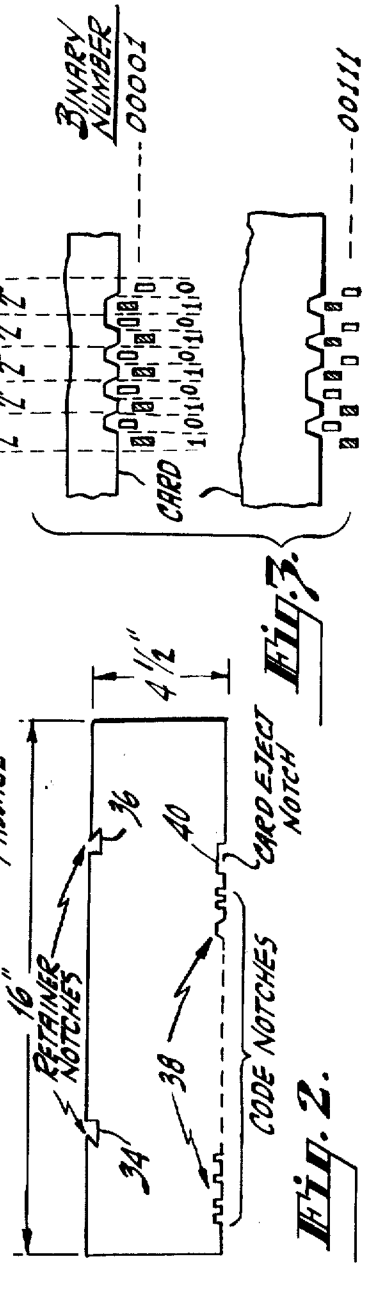
FIG. 2 is a drawing of a card employed in the system of FIG. 1.
FIG. 3 shows in more detail the coding employed for the cards of the system of FIG. 1.

FIG. 2 illustrates one practical form of card. Its dimensions are 4½" x 16". The card is flexible. The card storing binary or analog information is made of Mylar .004–.005" thick. It is coated on both sides with a thin layer of magnetic material. The card storing pictorial information may also be made of Mylar of the same thickness and may be coated with a photographic emulsion so that transparencies similar to microfilms may be printed on the card.

There are two notches 34 and 36 at the top of the card. Retainer arms mate with these notches and hold the cards in place in the magazine as is explained in more detail later. The notches 38 at the bottom of the card are for the purpose of identifying each card. FIG. 3, which is discussed shortly, shows how the selector bars cooperate with these notches to effect the selection of the card. The notch 40 at the bottom of the card engages the card ejector bar when the card is dislodged from the magazine. The ejector bar, in turn, moves the card out of the magazine as is also discussed in more detail shortly.

The number of code notches appearing at the bottom of a card depends upon the number of cards from which a selection must be made. In practice, there may be 10 or more different notch positions, however, the selection process is illustrated in FIG. 3 with five notch positions. The five notch positions are legended $2^0, 2^1 \ldots 2^4$, respectively. Each notch position has a zero side and a one side. The card in the top figure is notched to represent the binary number 00001.

There are two bars for each notch position. The bar representing the binary bit "one" is cross-hatched in FIG. 3 and the bar representing the binary digit "zero" is clear in the same figure. The selector bars for the top card in FIG. 3 are arranged to select the card coded with a binary number 00001. As can be seen in FIG. 3, if the card shown at the top is dislodged from its magazine, it will drop down and rest on the selector bars. On the other hand, differently coded cards will be held in position by one or more of the selector bars.

The bottom part of FIG. 3 illustrates a second card and the selector bars arranged to select this card. The binary code is 00111.

Figure 4:
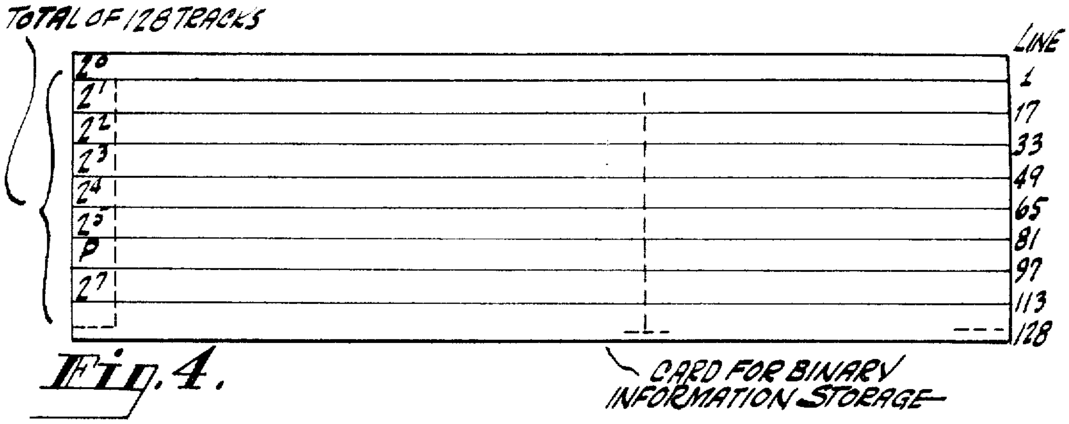

FIG. 4 illustrates a card for storing binary information. Here, and in FIGS. 5 and 6, the notches in the card are not shown. In a practical system there are 128 tracks carrying binary bits. Of these, only 8 tracks shown. The remaining tracks such as 2, 3 . . . 16, lie between the tracks shown (such as 1 and 17). In a practical system, the spacing between adjacent tracks may be 0.028 inch. All tracks are parallel to the long edge of the card.

As will be discussed in more detail shortly, in a preferred form of the system there are 8 write heads employed for the card of FIG. 4. These are substantially equally spaced (about 0.448 inch apart) along the width dimension of the card. The same heads may be used for reading; however, in one practical system, the read heads are separate from the write heads and are spaced "downstream" about 0.3 inch from the write heads. During one pass of the card, six information ($2^0$–$2^5$) tracks plus one parity (P) track plus one extra bit ($2^7$) track are written or read. Thereafter, all heads are shifted along the width dimension of the track a short distance (.028 inch) equivalent to the spacing desired between adjacent tracks. During the next pass of the card, eight additional tracks are read or written. These are interlaced between the first tracks. Thus, in 16 passes of the card, information may be read from or written into $16\times8=128$ tracks—the entire card.

While not of direct concern here, the system employed for reading information from the track may be self-clocking. Odd pairty may be employed and the output of the first seven tracks may be applied to an "or" gate to produce the self-clocking pulses. The self-clocking pulses are used to prime the output gates to which the pulses from the read heads are applied. The eighth bit, namely the extra data bit, is employed elsewhere in the data processing system and need not be discussed here.

It might also be mentioned here that binary information can be written on each side of the card. Therefore, each card is capable of storing a total of 256 tracks. It should be understood that any head configuration desired may be used including a full complement of heads across the entire card.

Figure 5:
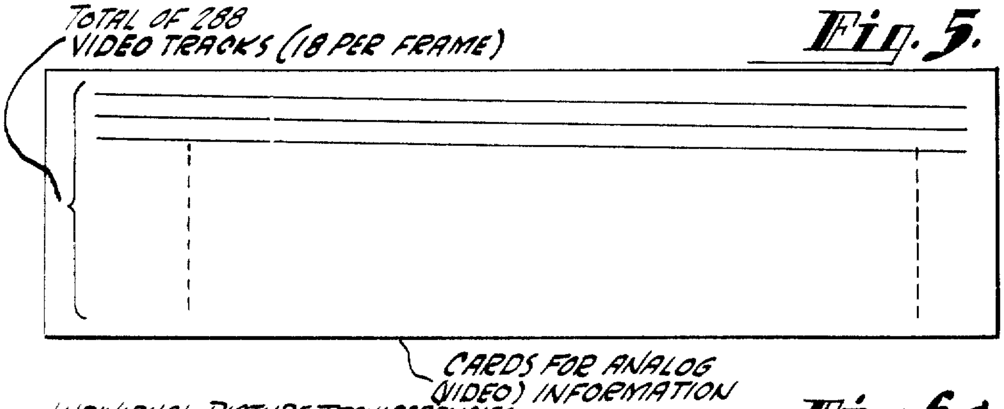

The card for storing analog information appears in FIG. 5. As is explained in more detail later, the analog information is written onto and read from the track by means of rotating read/write heads which rotate in a plane parallel to the long dimension of the track and which are moved during rotation along an axis parallel to the width dimension of the track. The video tracks are therefore at a slight angle with respect to the long edges of the card. In a practical system, 18 tracks of information are required to record one page of analog information. A total of 16 pages (frames) that is, a total of $16\times18=288$ information tracks) may be recorded on the card.

Figure 6A:
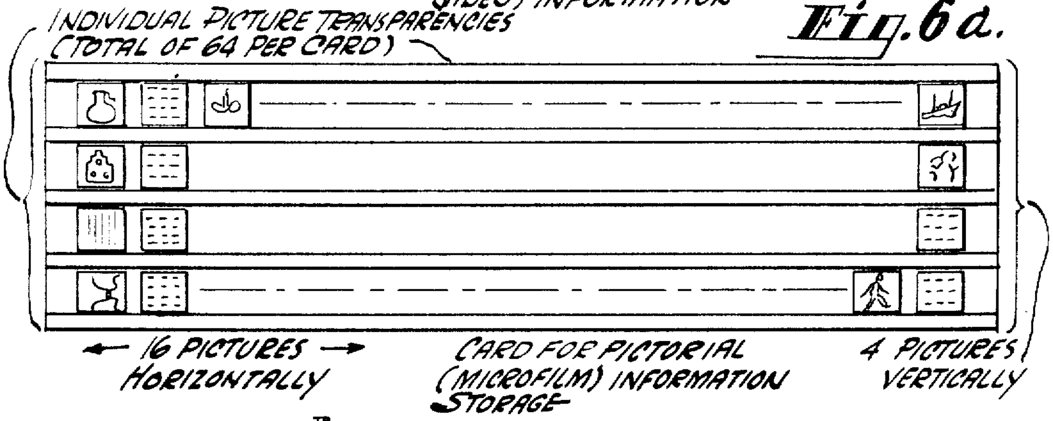
Figure 6B:
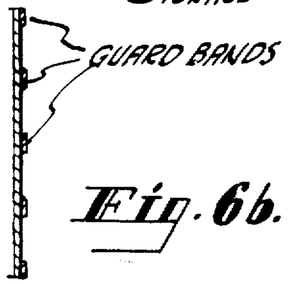

The card for storing pictorial information appears in FIG. 6*a*. In a practical system there may be 16 columns and four rows of picture transparencies giving a total of 64 pictures per card. The total number of pictures, that is, the size of each picture, depends upon the detail desired. This card may be a relatively thin Mylar sheet (.004 inch) having pictures printed directly onto the cards as transparencies. Further, as is seen more clearly in FIG. 6*b*, thin Mylar guard bands (perhaps .002 inch) may be used to prevent abrasion of the pictures.

Due to the increased thickness of the cards of FIG. 6, the magazine for these cards will store only about one-half the number of cards that the magazines for magnetic information will store. Therefore, in the picture storage area, two magazines are logically considered as a single magazine since the address (the selector bar positions) permit the selection of one card out of the total number of picture storage cards in two magazines. It might also be mentioned that the card transport system has sufficient clearance to handle both the thicker cards of FIG. 6 and the thinner cards of FIGS. 4 and 5.

A perspective view of a magazine suitable for the system of the present invention is shown in FIG. 7*a*. The magazine 40 is open on three sides, namely the short ends 42 and 44 and the bottom 46. The handle which is affixed to the top of the magazine consists of a solenoid 46 which controls the retainer members 48 and 50. These members normally engage the retainer notches 34 and 36 (FIG. 2) appearing at the top of the cards, however, when the solenoid is actuated, the retainer members 48 and 50 are retracted and the cards are free to fall from the magazine.

The card selector bars are shown at 52. When in operative position pressed against the base of the magazine they hold all of the cards in place except for one called for by the permutation of selector bars employed. If it is desired to return a card to a different magazine the address code may be expanded to 13 binary digits in which case it would uniquely define any card in 32 magazines thus permitting interchange of cards between magazines or delivery of cards to an empty magazine.

The ejector bar is shown at 54. It is engaged with the card 56 which has been selected and is removing this card from the magazine. The normal position of the ejector bar 54 is shown by dashed lines 57. The card dislodge mechanism is not shown in FIG. 7*a* but is discussed later.

A more detailed showing of a selector bar and several of the magazines appears in FIG. 7*b*. Three magazines 60, 62 and 64 are shown in part in FIG. 7*b*. A selector bar 66 is shown beneath the magazines in its relaxed position. The bar is supported by pivot members 68 and 70 and is controlled by solenoid 72 and mechanical linkage 74. When the solenoid is actuated, the mechanical linkage moves to the position indicated by the dashed lines **74*a* and the bar moves up against the bottom of the magazines as indicated by the dashed lines 66*a***.

Each magazine stores a relatively large number of cards 256 (for the cards of FIG. 4 and FIG. 5) in one practical system. The card return mechanism, which is discussed in more detail later, is shown in part at 76. This mechanism, when actuated, flips a card located in the notch 78 back into the magazine.

A more detailed showing of the card ejection mechanism appears in FIG. 7*c*. The ejection bar (corresponding to bar 54 of FIG. 7*a*) is shown at 80. It is connected through a mechanical linkage 82 to a solenoid mechanism 84. When the solenoid is actuated, a lever arm 86 rotates through an angle to the position indicated by dashed lines **86*a*. This causes the ejector bar to move to the position 80*a*** and the card is ejected to the left as viewed in FIG. 7*a*. As the ejector bar moves to the left, it drops away from the card. In the position **80*a***, the bar is completely disengaged from the card. When the ejector bar is in the latter position, the card has had sufficient inertia imparted to it so that it continues to move until it reaches a card driving belt, roller or the like as shown later.

Several means for dislodging the card selected from its magazine are possible. One form of dislodging mechanism is shown in FIGS. 8 and 9. It includes an eccentrically mounted wheel 90 which is coupled to a motor 92 through a clutch 94. The wheel 90 is in contact with the top of the magazine 96. The magazine is resiliently mounted to some fixed support as is indicated schematically by the springs 98 and symbol 100 in FIG. 9.

In operation, motor 92 is normally operative but the clutch 94 disengages the motor shaft 102 from the shaft 104. After the card selector bars (not shown in FIG. 8) are in position against the bottom of the magazine, the clutch 94 is actuated. The actuating means may include a relay circuit and a holding circuit therefor. Light from source 106 which passes through the collimating means 108 onto the photocell 110 causes the holding circuit to continue to energize the relay. The relay and holding circuit are located in block 112. When the vibration of the magazine caused by the rotating eccentric 90 causes the card selected to drop out of the magazine, the card interrupts the light from source 106. Thereupon, the photocell output drops to zero and the relay holding circuit opens. This causes the clutch 94 to become inactivated and the rotation of the wheel 90 ceases. It also causes the solenoid 84 (FIG. 7*c*) to become actuated.

An alternative dislodging mechanism is shown in FIGS. 19 and 20. It comprises a set of four loudspeaker type electromagnet elements (drivers) 91 which are coupled to the selector mechanism support casting 93. The casting 93 may be connected to bars **71*a* and 71*b*** of FIG. 7*b* via plates (not shown) located at the ends of these bars. When so coupled, the support or ground symbol of FIG. 7*b* refers to the casting 93 of FIG. 20. A set of springs 95, and bars 97, are mounted to the door 99 and contact the top 101 of the magazines 103.

Figures 10B, 10C, 10D:
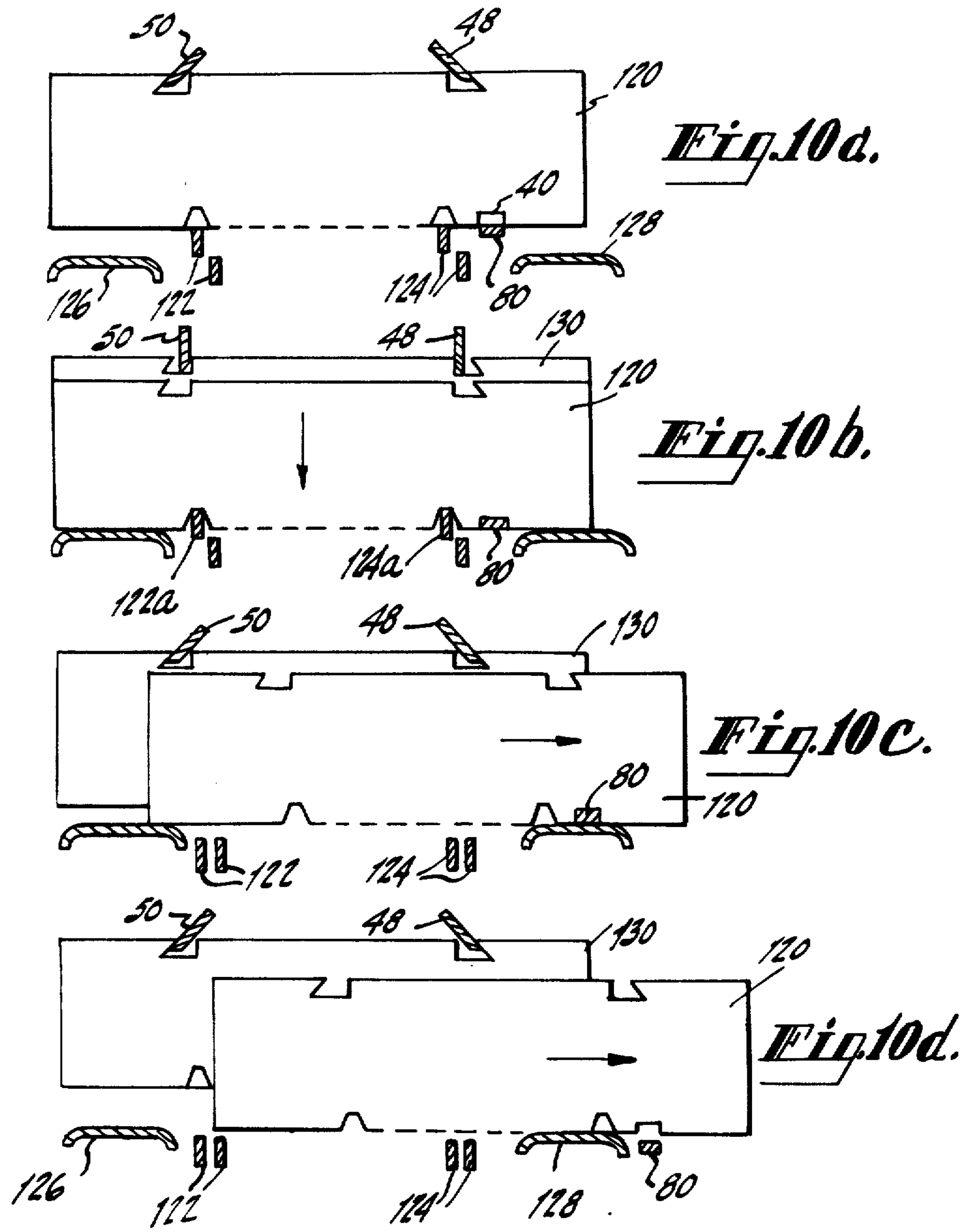

In operation, when the magazines 96 are loaded and door 99 is closed and latched (the latch is shown at 111) the loudspeaker type drivers 91 are caused to vibrate continuously, through a small excursion, in resonance with the system. The signal to the drivers is preferably at 60 cycles. In a practical system, all the magazines may be vibrated with an acceleration of 2 to 3 "*g*'s" in this manner. When a given magazine is addressed, its retainer members 48 and 50, FIG. 10*b*, are released just after the selector bars have been positioned against the bottom of the magazine. The card from this particular magazine is then free to drop. When the card has dropped approximately ⅛ inch, light from source 105 onto the photocell 107 is interrupted. Thereupon the photocell output drops to zero and a relay holding circuit 109 opens. This causes ejector solenoid 84 (FIG. 7*c*) to become activated and the card to be loaded into the transport. For purpose of drawing simplicity the card transport system, which would be located in areas 113, is not shown in FIGS. 19 and 20.

While not illustrated, other means for dislodging a card may be used. For example, each card may have a small soft iron insert secured to its bottom edge and a powerful electromagnet used to separate as well as to withdraw the card. Alternatively, the magazine may be struck several blows with an electrically actuated hammer mechanism in order to cause the card to be dislodged.

The entire process of card selection is illustrated in FIGS. 10*a*–10*d*. In FIG. 10*a* the card 120 is held in position by the retaining elements 48 and 50. The selector bars, two pairs of which are shown at 122 and 124, respectively, are in place. The card ejector bar 80 is in its normal position. Members 126 and 128 are for the purpose of guiding the card during its ejection from a magazine.

In FIG. 10*b* the card retainer elements 48 and 50 have been withdrawn and the card 120 has been dislodged from the magazine, by vibrating the magazine in the manner already described. This card therefore drops down onto the retainer bars **122*a* and 124*a*. The card eject notch 40 of the selected card is now engaged with the ejector bar 80. The remaining cards 130 remain in their original position in the magazine. They are held in place by the selector bars 122*a* and 124*a*** and/or other selector bars (not shown).

In FIG. 10*c* the selector bars 48 and 50 have been returned to their normal position and now hold all of the cards, except the one selected, in position in the magazine. The selector bars 122 and 124 have been returned to the withdrawn position. The ejector bar 80 has begun to move the selected card 120 to the right, out of the magazine.

FIG. 10*d* illustrates the position of the ejector bar 80 at the end of its path of travel. The bar has now dropped away from the card. The card continues to move out of the magazine under its own inertia. Shortly, a belt (not shown) engages the card and drives it along the card transport passage as is discussed later.

A partially cut-away view of a magazine containing cards and showing the details of the card return to magazine mechanism appears in FIG. 11. The card returned to the magazine has been slid into the rear of the magazine and is shown at 140. The card return mechanism includes a lever 142 and a rotatable notched member 144. The latter is located at one corner of the magazine, but is not here considered a part thereof.

In order to return the card, a cam 146 is moved in the direction of arrow 148. This causes the roller 150 to bear down against the top of the lever 142 and the lever moves in the direction of arrow 154. At the same time the driving mechanism (not shown) for the notched cylinder 144 drives this cylinder in the clockwise direction as indicated by arrow 156. The end of the card is engaged with a notch in the cylinder.

The lever arm 142, when actuated, causes the card to bow inwardly and to flip out of the notches 158 and 160. The clockwise rotation of member 144 also causes the card to flip out of the notch in member 144 and into the magazine.

The card transport passage and a card driving means are illustrated in FIGS. 12*a*–12*c*. The passage consists of spaced apart parallel members 170 and 172 between which the top and bottom edges, respectively, of the card ride. The size of the slots and the spacing of the members from each other is such that a slight amount of clearance exists. The short or width dimension of the card is in the direction of arrows 174. The long dimension of the card is in the direction of arrows 176.

The drive mechanism for the card includes a motor 178 (FIG. 12*b*) which is coupled to driver wheels 180 and 182. Belts 184 and 186 engage the driver wheel with idler wheels. Two such idler wheels are shown at 188 and 190, respectively, in the more detailed view of FIG. 12*c*. Idler rollers **180*a* and 180*b* at each of the magazine stations are loosely adjusted to the drive belt 184. When a card such as 183 leaves the magazine it is engaged by the idler rollers 180*b* and the belt 184. The rollers 180*a*** serve as back up rollers to provide the necessary driving force.

A card is shown in the transport passage in FIG. 12*c*. The belt 184 and roller **180*b* are engaged with the card and drive the card along the passage. In a similar manner, the belt 186** engages the top edge of the card and also drives the card.

A schematic showing of a portion of the system appears in FIG. 13. Four of the magazines 200, 202, 204 and 206 are shown. The selector bars, of which are shown at 208, are located beneath the magazines. The ejector bar shown at 210 is in the card eject position. It has moved in the direction indicated by arrow 212 and removed a card 214 from the magazine. This card is entering the drive passage and one end portion of the card is engaged with the drive belt 216. Located along the length of the passage is a mechanical gate member 218 which is controlled by a solenoid 220. In the position of the gate element shown, the card selected will enter the passage 222 leading to the read/write station.

The binary read/write station includes eight pairs of binary read/write heads, one pair of which, 224 and 226, are shown. One of this pair of heads is for reading and writing information on one side of the card and the other of the heads for reading or writing information on the other side of the card. The air inlets shown at 228 and 230 are for the purpose of providing an air-bearing for the moving card. The air bearing reduces the friction between the card and the channel along which the card moves and in this way reduces the build up of static charges.

There are two vacuum inlets 232 and 234 on one side of the channel 222 and two vacuum inlets 236 and 238 on the other side of the read channel. Their purpose is to draw the card against the head being used to write or read information. For example, if it is desired to read the information on the card with head 224, a vacuum is applied to passages 232 and 234 but not to passages 236 and 238. The effect of applying a vacuum is to cause the card to bear against the head as is shown in more detail later.

The gate 240 controlled by solenoid 241 directs the moving card into the recirculate passage 242 or to the return to magazine passage 244. In the position shown, the gate 240 directs the card into the recirculate passage. This permits the card to make a second, third or higher number of passes through the binary read/write station and in this way the entire card may be written or read. As previously mentioned, in one specific practical system, sixteen passes are used to read one side of an entire card.

The card return passage 244 leads to individual paths 246, 248, 250 and 252 to the respective magazines. The gate elements for these various return paths are controlled by solenoids 254–257, respectively. A drive system similar to 216 is used to insure positive return to the magazines.

Although not shown, there is a drive means associated with the read/write heads. This includes drive rollers and is illustrated in more detail later. Also, if the return path 244 is sufficiently long, it may be desirable to include an additional drive means such as 216 for the return path.

The paths 260 and 264 lead to and from the other stations (analog and pictorial) of the system. These stations are shown generally in FIG. 1 and in more detail later. The paths 264 and 266 are available for additional magazines. These would be positioned similarly to the magazines shown. The selector bars driving means for the dislodge mechanism and ejector bar can be common to these additional magazines and the ones shown. Further, if desired, an entire group of magazines may be added to the system and this group have its own selector and ejector mechanisms. This group of magazines can connect to an input path such as 264 and to the return path such as 266.

A more detailed showing of a gate control system appears in FIG. 14*a*. It includes a solenoid 270 coupled by a shaft 272 to the gate element 274. The latter is shown in its retracted position, recessed into the wall 276. The gate element pivots from axle 278. When the solenoid is actuated, the gate moves to the position indicated by dashed line **274*a***.

In the position shown of the gate element 274 the card 280 moves into the passage 282 and in the position of the gate element shown at **274*a* the card would move into the passage 284**.

An alternative system for selecting one of two paths for card travel is shown in FIG. 14*b*. It consists of two inlets 290 and 292. These go through various valves to a source of compressed air or a vacuum source. When the inlets 290 and 292 are inactive, the card moves straight ahead into passage 296. However, if compressed air is applied to inlet 290 or if air is drawn out of inlet 292, the card moves into passage 294.

A more detailed showing of the read/write section for binary information appears in FIGS. 15*a–d*. In FIG. 15*a* the card is shown at 300. It is supported between parallel blocks 302, 304. Eight read/write heads are mounted in each block. The card is driven past the read/write heads by drive wheels 306 and 308 which engage the upper and lower edge, respectively, of the cards. Idler wheels 310 and 312 are located on the other side of the cards. The drive means for the drive wheels is illustrated schematically at 314. The coupling between this motor 314 and the drive wheels is indicated by dashed line 316.

It is important in the system that the card be accurately positioned with respect to the read/write heads. This is accomplished by both the arrangement of the drive wheels and the resilient supporting means for the card. The resilient supporting means consists of a foam plastic material 318 which may be polyurethane. There is a thin flexible plate 320 which may be stainless steel, loosely supported by the foam plastic. The spacing between the element 320 and the upper element 322 is slightly smaller than the width dimension of the card. Therefore, the card enters the read/write station and the resilient plastic 318 forces the card up against the upper support 322.

The wheels 306, 308, 310 and 312 also help in maintaining the card pressed against the upper supporting element 322. These wheels are tilted through a slight angle such as a half a degree so that they drive the card not only in the forward direction, that is, to the right in FIG. 15*c* but also in the upward direction against the supporting element 322.

The solenoid mechanism 324 is mechanically coupled to the opposite walls 302, 304. The purpose of the solenoid mechanism is to move these walls and the heads along with them through discrete distances. This makes it possible for the heads to write or read on different tracks on card during successive passes of the card through the read station.

The actual position of the solenoid mechanism 324 with respect to the head block is shown in FIG. 15*c*. A more detailed showing of the solenoid mechanism appears in FIG. 21. Referring to FIG. 21, the solenoid mechanism may include four separate solenoids within a common cylinder 600. Each of the solenoids has a different length of stroke. Each of the solenoids is movable with respect to the cylinder 600 and also with respect to the adjacent solenoid.

Each solenoid includes a coil 602 and a plunger 604 within the coil. The solenoid is prevented from rotating by a pin 606 in the slot 608. The slot 608 also serves as an opening through which the wires 610 for actuating the solenoid enter the solenoid.

In the solenoid illustrated, the greatest stroke possible is .224 inch and the smallest stroke is .028 inch. The total travel length possible is therefore $$.224+.112+.056+.028=.420 \text{ inch}$$

Various permutations of the solenoid permit one to produce movements of shaft 325 any amount desired less than .448 inch in multiples of .028 inch. For example, when solenoid 612 is actuated its plunger 604 moves in the upward direction .056 inch. This causes solenoids 614 and 618 both to move in the upward direction with respect to the cylinder 600 holding the solenoids. A resultant movement of .056 inch is imparted to the shaft 325.

If it is desired to cause the shaft 325 to move through an .084 inch, solenoids 620 and 612 are actuated. The plunger of solenoid 620 moves all solenoids above it .028 inch. The plunger of solenoid 612 moves all solenoids above it an additional distance of .056 inch.

While in the example above, specific stroke lengths are given which are compatible with the track spacings already described, it is to be appreciated that these stroke lengths are examples. Any desired combination of solenoids may be employed, depending upon engineering requirements. The mechanism for actuating the solenoid is not shown. It may consist of a four stage binary register and means for selectively actuating the stages of the register for selecting a desired combination of stroke lengths.

FIG. 15*b* is a cross-section along lines **15*b*—15*b*** of FIG. 15*a*. It shows the card 300 and the driver and idler wheels 303 and 310, respectively, engaged with the card.

FIG. 15*c* shows more clearly the eight read/write heads. FIG. 15*c* also shows two sets of vacuum ports 330 and 332, respectively. Their purpose is to draw the card toward the read/write heads as is shown in more detail in FIG. 15*d*. The air inlet 334 of FIG. 15*c* is for the purpose of admitting air under pressure to the channel between the two walls 302 and 304. This air provides an air bearing for the card as it passes through the read/write station, as already discussed.

FIG. 15*d* is a more detailed showing of the read/write heads and the vacuum ports. When a vacuum is applied to ports **330*n* and 332*n* the card 300 is moved against the read/write head 336** as shown in FIG. 15*d*. During the time the vacuum is applied to ports **330*n* and 332*n*, the ports 338 and 340** are inactive. FIG. 15*d* also shows in greater detail the air inlets 334 and **334*a*. Both inlets are active at the same time and the air flowing out of the inlets supports the card between the two walls 302 and 304**.

The analog read/write station is shown in cross-section in FIG. 16*a*. It includes a rotatable headwheel 350 with a number of read/write heads mounted along the circumference of the wheel. Only two such heads are shown at 352 and 354, respectively, however, in the preferred embodiment 16 sets of heads are used. The card is shown at 356. The long dimension of the card extends around the circumference of the headwheel 350.

The card enters via passage 358 and leaves via passage 360. When the card first enters the read-write station, it is stopped by the card stop 362. Thereafter, a vacuum is applied to ports 364 in order to hold the card in position and the card stop 362 is withdrawn. There after, the rotating heads write or read informaiton from the card in a manner to be discussed in more detail shortly. The writing or reading is done by the heads 352, 354 in succession. In other words, the first line may be written by head 352 and the next line by head 354 and the next line by 352 and so on. During the writing of information, the head moves in a direction into and out of the paper as well as rotating as is discussed in more detail shortly. Also, during the time a head is writing (or reading), a vacuum is applied to the vacuum ports located adjacent to the head. Two such ports are shown schematically at **336*a* and 336*b* and two additional ports are shown at 368*a* and 368*b***.

The synchronization head and notch are employed here for purpose of controlling the speed of the headwheel 350. These elements are commercially available and are discused in RCA Broadcast News, vol. 193, p. 58 (March 1959).

After the desired information has been written onto or read from the card, the vacuum source is disconnected from port 368. This permits the rotating head to move the card into the card output passage 360.

The cross-sectional view of FIG. 16*b* shows details of the headwheel and card retaining wall. The headwheel 350 is formed with circumferential flanges 372 and 374. Their purpose is to retain the card 356 as the headwheel moves in the direction of arrow 376. The outer wall 378 is fixed to the chassis and does not move.

A more detailed showing of the driving arrangement for the video head appears in FIG. 17. The headwheel is shown at 350. It is fixed to a shaft 380 which is fixed to thrust bearing 382 via pivots 384 and **384*a*. The headwheel and thrust bearing are continuously rotated by the head drive motor 386. The latter is coupled to a pulley 388 by means of the belt 390. Pulley 388 is slidably mounted to shaft 380 by means of splines 381**.

During the rotation of the headwheel 350 it may be moved also in the direction of the axis of shaft 380. The means for doing this includes the solenoid 392 the follower arm 394, and the threads 396.

The selection of the proper pair of read/write heads from the 16 pairs available determine which frame is being read or written. The selection circuits are known and may include, for example, a binary address register. When the read or write signal is received from the computer (not shown), solenoid 392 forces follower arm 394 outward so that when it reaches thread lead in **396*a* it engages the threads 396. With arm 394 engaged with threads 396, the heads accurately align with the tracks. The rotation of the shaft 380 causes follower 394 to ride in the threads, the arm 397 to move up with respect to pivot pin 384*a* and the pin 384, shaft 380 and headwheel 350** to be forced upward. In a practical system, 18 threads are employed corresponding to the 18 tracks per head.

The detailed views of FIGS. 17*e* and 17*f* show how the shaft 380 is pivotably assembled to arm 397 by pin 384 and how the arm 397 is pivotably assembled to an extension **382*a* of thrust bearing 382. A silder block 384*b* is used for the latter. The slider block is used as the distance between pivot pins 384 and 384***a* changes slightly as shaft 380 moves up. Shaft 380 may be moved upward a distance *h* (about .2 inch) whereas follower 394 moves a distance *h'*, some 10 to 20 times *h* (depending upon design requirements). This large ratio insures accurate read/write track alignment.

As already mentioned, the tone signal method of generating a feedback signal to the drive motor 386 is employed for obtaining speed control. The tone signal is developed at pick-up head 373 by one notch 350*a* or several such notches equally spaced around the circumference of flange 372. The greater the number of notches 350*a*, the more accurate the speed control which is possible. This signal is applied to the control system 385 for motor 386 which controls the motor speed. Suitable control and other circuits are commercially available and are discussed generally in an article appearing in RCA Broadcast News, vol. 100, starting at p. 6, (April 1958).

In the arrangement illustrated, the weight of the wheel 350 and shaft 380 serves to return them to their original position when follower arm 394 is withdrawn.

A schematic showing of the pictorial read and reproduction station appears in FIGS. 18*a* through 18*g*. Referring first to FIGS. 18*a* and 18*b*, the card containing pictorial information is shown at 450. Here and in the other parts of FIG. 18 the raised ridges on the card are not shown. Light from a source 452 is reflected from a mirror 454 through the four pictures appearing in one of the columns of the card. A mask 456 having a single opening 458 therein is located behind the card 450. The position of the opening is controlled by a solenoid mechanism 460.

The linkage 457 between the solenoid mechanism and the mask 456 is shown somewhat more clearly in FIG. 18*b*. The solenoid mechanism may be similar to the one shown in detail in FIG. 21, however, since the mask 456 need be moved only to one of four discrete positions, only two solenoid sections are required.

The light which passes through the picture selected in a column is applied by an optical system, illustrated schematically as a group of lenses 4, onto an image receiving means 468. The latter includes a translucent viewing screen for examining the picture locally and/or a "Permachon" (storage) tube for scanning the picture and transmitting it to remote viewers. It also may include a means for reproducing in permanent form the image viewed on the screen. This, for example, may be in the form of an Electrofax reproducing machine.

The means for selecting the column of pictures from which one picture is to be selected is shown in FIGS. 18*d*, 18*e* and 18*f*. It includes a plurality of stop bars—16 in the example chosen for illustration. These are controlled by 4 pairs of address bars. One of the stop bars is shown in detail in FIG. 18*d*. It includes a plurality of notches along its lower edge. In FIG. 18*d* the notches are coded to represent the binary number 1101. The address bars of FIG. 18*d* are similar to those of FIG. 3. Each pair of bars consists of a first bar which represents the binary bit 1 and a second bar which represents the binary bit 0. When the first address bar of a pair of such bars is in its raised position, it represents the binary bit "one" and when the first bar of a pair of bars is in its lower position it represents the binary bit "zero."

An electromagnet 700 is shown at the left of the stop bar 702 of FIG. 18*d*. This electromagnet is common to all 16 stop bars. A means such as spring return 703 maintains the card in the position shown at the upper part of the figure when the electromagnet is not energized. The card position with respect to the stop bar, is illustrated at 704. The portion of the card visible is the short or width dimension of the card.

In the operation of the arrangement illustrated schematically in FIGS. 18*d*–18*e*, first the address bars are positioned to represent a desired binary number. Then, the electromagnet 700 is actuated. The stop bar coded to correspond to the address bars is drawn to the left (FIG. 18*d*) by the energized electromagnet. However, the address bars hold the remaining 15 stop bars in their retracted position. The lower part of FIG. 18*d* shows the stop bar 702 moved to the left by the electromagnet 700. In this position, the stop bar blocks the card 704, as illustrated by the dashed lines 704.

FIG. 18*e* illustrates schematically the 16 stop bars and the four pairs of address bars. The address bars are beneath the stop bars. The electromagnet 700 (shown as a block in this figure) has been energized and has caused the 15th stop bar 706 to be moved outward (in the upward direction in FIG. 18*e*). In this position bar 706 blocks the card 704 and prevents further movement of the card.

FIG. 18*f* illustrates schematically the means for actuating the various address bars. Each address bar is actuated by a solenoid such as 710. When the solenoid is actuated, the address bar is moved to its upward position as illustrated by solid line 712. When the solenoid 710 is inactive, the address bar is retracted to its lower position, as shown by dashed line 712*a*, by the spring 714. The upper position of the address bar corresponds to the position of address bar 715 in FIG. 18*d*. The lower position of an address bar corresponds to the position of the address bar 716 in FIG. 18*d*.

FIG. 18*c* shows, in schematic form, one way of driving the card and maintaining it against the stop. Air chambers 509 and 509*a*, which are supplied with air under pressure from a source which is not shown, apply this air through apertures 718 to the card 450 and the belts 508 and 508*a* which drive the card. The air pressure is sufficient to maintain the belt against the card for driving the card, but it also permits the belt to slip with respect to the card when the card is held up by a stop bar. The air pressure is distributed along the entire length, top and bottom, of the card to maintain the unit pressure relatively low and in this way to reduce wear on the card.

FIG. 18*g* shows schematically a complete picture read station. It includes two card stop systems such as shown in FIG. 18*e*. It also includes a reversible drive system for the card 450. The drive system includes pulleys 720 and 720*a*, a belt 722 and a reversible drive motor and clutch 724. The reversible drive system and the double card stop system permits a picture card to be moved in either direction so that pictures in any column may be selected during the time the picture card is in the picture read station area.

What is claimed is:

1. In an information storage and retrieval system comprising, in combination, a plurality of magazines, each storing a plurality of cards; a selection system common to all magazines for selecting any card in any magazine; a card transport system common to all magazines; a station for reading binary information from the cards; a station for reading analog information from the cards; and means for routing the card selected between its magazine and the station appropriate for the card via said common card transport system.

2. An information storage and retrieval system comprising, in combination, a plurality of magazines, each storing a plurality of cards, some cards magnetically storing binary information, some cards magnetically storing analog information, and some cards storing pictorial information; and means each for reading the different forms of information from the cards; a selection system common to said plurality of magazines for selecting any card in said plurality of magazines; and means for routing the card selected to the means for reading information stored thereon and for thereafter returning the card to its magazine.

3. An information storage and retrieval system comprising, in combination, a plurality of magazines, each storing a plurality of cards, some cards magnetically storing binary information, some cards magnetically storing analog information; and some cards storing pictorial information in the form of transparencies; three stations including a read/write station for said binary information, a read/write station for said analog information, and a station for said pictorial information; a card transport system common to all cards; and means for selecting and ejecting a desired card from a magazine and directing it through said card transport system to a station appropriate for the card.

4. An information storage and retrieval system comprising, in combination, a plurality of magazines, each storing a plurality of cards, some cards magnetically storing binary information and some cards magnetically storing analog information; a read/write station for said binary information; a read/write station for said analog information; and a system common to all magazines for selecting and ejecting a desired card from any magazine, transporting the card to the read/write station appropriate for the card; and then returning the card to a magazine.

5. In the system set forth in claim 4, said card comprising a flexible member formed of Mylar coated on both sides thereof with magnetic material.

6. A system as set forth in claim 4, further including a recirculate card transport path for receiving a card after it has passed through the read/write station for binary information and for returning the card to the same read/write station; and said read/write station for binary information including read/write heads and means for changing the position of said heads to permit reading and writing binary bits on different tracks of the card during successive passes of the card through the read/write station for binary information.

7. In an information storage and retrieval system, in combination, a plurality of magazines, each storing a plurality of Mylar cards coated with magnetic material; a read/write station for said cards; a recirculate card transport path coupled to said station; and a card transport system common to all magazines for moving a selected card from a magazine to said station, recirculating the card through said card transport path a desired number of times, and then returning the selected card to its magazine.

8. In an information storage and retrieval system, in combination, a plurality of magazines, each storing a plurality of cards coated with magnetic material; said cards being formed with code notches at their lower edge; means including a plurality of selector bars common to all of said magazines for selecting one of said cards; means for vibrating said magazines to cause the card selected to drop down from a magazine; an ejector bar common to all magazines for engaging the card dropped down and ejecting it from the magazine; a read/write station; and a card transport system common to all magazines for moving the card ejected from said magazine to said station and returning it to said magazine.

9. In an information storage and retrieval system, in combination, a hollow, three walled magazine having first and second parallel side walls, an upper third wall perpendicular to said side walls, a first opening opposite said third wall, and second and third openings perpendicular to said three walls and located at opposite ends of the magazine; a plurality of cards in said magazine arranged parallel to said parallel side walls; means operatively associted with said magazine for causing the lower edge of one card to drop beneath said first opening; and means for engaging the lower edge of said one card and ejecting said card from the magazine through said second opening.

10. In an information storage and retrieval system, in combination, a hollow magazine having first and second parallel side walls, an upper third wall perpendicular to said side walls, a first opening opposite said third wall, and second and third openings perpendicular to said three walls and located at opposite ends of the magazine; a plurality of cards in said magazine arranged parallel to said parallel side walls; means operatively associated with said magazine for causing the lower edge of one card to drop beneath said first opening; means for engaging the lower edge of said one card and ejecting said card from the magazine through said second opening; and means for returning said card to said magazine through said third opening.

11. In an information storage and retrieval system, in combination, a hollow, three sided magazine having rear and forward parallel side walls, an upper third wall perpendicular to said side walls, a first opening opposite said third wall, and second and third openings perpendicular to said three walls and located at opposite ends of the magazine; a plurality of cards in said magazine arranged parallel to said parallel side walls; means operatively associated with said magazine for causing the lower edge of one card to drop beneath said first opening; means for engaging the lower edge of said one card and ejecting said card from the magazine through said second opening; means for returning the card to the rear of said magazine through said third opening; and means for engaging the card returned to the magazine for flipping said card into the magazine into the last card position in said magazine.

12. In an information storage and retrieval system, in combination, a hollow, three walled magazine having first and second parallel side walls, an upper third wall perpendicular to said side walls, a first opening opposite said third wall, and second and third openings perpendicular to said three walls and located at opposite ends of the magazine; a plurality of cards in said magazine arranged parallel to said parallel side walls; means operatively associated with said magazine for selecting a desired card from the magazine through said first opening; means operatively associated with said magazine for ejecting the card selected through said second opening; and means operatively associated with said magazine for returning said card selected through said third opening.

13. In an information storage and retrieval system, in combination, a magazine comprising a hollow container having an upper wall and parallel side walls and an opening at the lower end thereof; card retainer elements extending through the upper wall of the container; and a solenoid fixed to the upper wall of the container for actuating the card retainer elements and serving also as a handle for the magazine.

14. In an information storage and retrieval system, in combination, a fixed support; a card magazine comprising a hollow container having an upper wall, parallel side walls and an opening at its lower end, said container being mounted to the support in such manner that it can be vibrated with respect to the support; a wheel engaged at its circumferential surface with a wall of the container; an axle for driving the wheel fixed to the wheel in off-center position; and a driving means connected to the axle and fixed to said support.

15. In an information storage and retrieval system, in combination, a fixed support; a card magazine resiliently mounted to the support comprising a hollow container having an upper wall, parallel side walls and an opening at its lower end; a wheel engaged at its circumferential surface with the upper wall of the container; an axle for driving the wheel fixed to the wheel in off-center position; and a driving means connected to the axle and fixed to said support.

16. In an information storage and retrieval system, in combination, a card magazine having an opening through which a card desired may be selected; a plurality of cards in the magazine; means coupled to the magazine for dislodged a card from the magazine and causing it to extend at least partially through said opening; and means responsive to the movement through a predetermined distance of the card dislodged for inactivating the means for dislodging the card.

17. In an information storage and retrieval system, in combination, a card magazine having an opening at its lower end through which a card desired may be selected;

a plurality of cards in the magazine; selector means operatively associated with said cards for holding all except a desired one of the cards in place in said magazine; means coupled to the magazine for vibrating the magazine for causing said desired card to drop away from the remainder of the cards in the magazine and to extend at least partially through said opening; and means responsive to the dropping of said card for completing the withdrawal of the card from the magazine.

18. In an information storage and retrieval system, in combination, a source of light; a photocell arranged to receive the light from said source; a card magazine having an opening at its lower end through which a card desired may be selected; a plurality of cards in the magazine; selector means operatively associated with said cards for holding all except a desired one of the cards in place in said magazine; means coupled to the magazine for vibrating the magazine for causing said desired card to drop away from the remainder of the cards in the magazine, to extend at least partially through said opening and to block the light from the source from reaching the photocell; and means responsive to the interruption of light received by the photocell for engaging the card and completing its withdrawal from the magazine.

19. An arrangement for positioning a card as it passes a head of a recording station comprising, in combination, an upper guide member along which the upper edge of the card rides, a lower guide member along which the lower edge of the card rides; a fixed support for said lower guide member; and a resilient foam plastic material located between said fixed support and a said lower guide member for urging the latter against the lower edge of the card.

20. An arrangement for positioning a card as it passes a head of a recording station comprising, in combination, an upper guide member along which the upper edge of the card rides, a lower guide member along which the lower edge of the card rides; a fixed support for said lower guide member; a resilient foam plastic material located between said support and said lower guide member for urging the latter against the lower edge of the card; and a driver wheel and idler, one on each side of the card and together engaging the card, for driving the card past said head, said wheels being tilted toward said upper member so as to constantly urge the card against said upper guide member.

21. An arrangement for magnetically recording analog information on a card comprising, in combination, a cylinder formed with circumferential flanges parallel to the cylinder axis and including a head mounted in the circumferential surface thereof; a card holder semi-circumferentially arranged around the circumferential flanges; means coupled to the cylinder for rotating the same; and means coupled to the cylinder for moving the same in its axial direction during the rotation thereof, said flanges being arranged to hold the card in place during the axial movement of the cylinder.

22. In an information storage and retrieval system, in combination, a fixed support; a card magazine resiliently mounted to the support comprising a hollow container having an upper wall, parallel side walls and an opening at its lower end; a plurality of cards in said magazine, the cards being formed with code notches at their lower edges; a plurality of selector bars abutting the lower end of said magazine for retaining the cards in position in the magazine, and means for vibrating the system including the selector bars and magazine at the natural resonant frequency of the system for causing an appropriately coded card to be dislodged from the magazine into and to extend partially through said opening.

23. In an information storage and retrieval system, in combination, a fixed support; a card magazine resiliently mounted to the support comprising a hollow container having an upper wall, parallel side walls and an opening at its lower end; a plurality of cards in said magazine, the cards being formed with code notches at their lower edges; a plurality of selector bars abutting the lower end of said magazine for retaining the cards in position in the magazine, and means including a coil and a source supplying an alternating current to the coil for vibrating the magazine and selector bars at the frequency to which they are mechanically resonant for causing an appropriately coded card to be dislodged from the magazine into and to extend partially through said opening.

24. In an information storage and retrieval system, in combination, a fixed support; a plurality of card magazines resiliently mounted to the support, each said magazine comprising a hollow container having an upper wall, parallel side walls and an opening at its lower end; information storage cards in each of the magazines, said card being formed with code notches along their lower edge; a plurality of selector bars common to all of the magazines and engaging the lower edges of the magazines, said bars being arranged in accordance with a predetermined code to select one of the cards stored in one of the magazines; and means coupled to said selector bars for vibrating the bars and magazines at the natural frequency to which the system including the bars and magazines is mechanically resonant.

25. In an information storage and retrieval system, in combination, a fixed support; a plurality of card magazines resiliently mounted to the support, each said magazine comprising a hollow container having an upper wall, parallel side walls and an opening at its lower end; information storage cards in each of the magazines, said card being formed with code notches along their lower edge; a plurality of selector bars common to all of the magazines and engaging the lower edges of the magazines, said bars being arranged in accordance with a predetermined code to select one of the cards stored in one of the magazines; and a plurality of loudspeaker type driver elements coupled to said selector bars for vibrating the bars and magazines at the natural frequency to which the system including the bars and magazines is mechanically resonant.

26. In an information storage and retrieval system, in combination, a fixed support; a plurality of card magazines resiliently mounted to the support, each said magazine comprising a hollow container having an upper wall, parallel side walls and an opening at its lower end; information storage cards in each of the magazines, said card being formed with code notches along their lower edge; a plurality of selector bars common to all of the magazines and engaging the lower edges of the magazines, said bars being arranged in accordance with a predetermined code to select one of the cards stored in one of the magazines; means coupled to said selector bars for vibrating the bars and magazines at the natural frequency to which the system including the bars and magazines is mechanically resonant; and means responsive to the extension of a card through an opening in a magazine for engaging the card and ejecting it from the magazine.

27. In combination, a headwheel; a recording head mounted in said wheel; an annular member formed with circumferential threads about its inner surface; a follower arm adapted to engage said threads; and means coupling said follower arm to said headwheel for moving said headwheel in the axial direction during the rotation of the headwheel when said follower arm engages said threads.

28. In a recording station, a rotatable first annular member; a recording head located in said member; an information storage card arranged circumferentially around said annular member; a shaft passing through the center of said member for rotating the same; a fixed second annular member formed with a helical groove on its inner surface; an arm coupled to said shaft and rotatable therewith, and formed with a follower pin at one end thereof which is adapted to engage said groove; and means for causing axial movement of said shaft during the rotation thereof comprising means for causing said follower pin to engage said groove.

29. In a recording station, a rotatable first annular member; a recording head located in said member; an information storage card arranged circumferentially around said annular member; a shaft passing through the center of said member for rotating the same; a fixed second annular member formed with a helical groove on its inner surface; a supporting element which rotates with the shaft but with respect to which the shaft is movable in the axial direction of the shaft; an arm pivotally coupled at one end to the supporting element, coupled at an intermediate point to the shaft, and including, at its opposite end, a follower pin which is adapted to engage said groove; and means for causing axial movement of said shaft during the rotation thereof comprising means for causing said follower pin to engage said groove.

30. In a recording station as set forth in claim 29, the spacing between the coupling to the supporting element and the coupling to the shaft being substantially smaller than the spacing between the coupling to the shaft and said groove.

31. In an information storage and retrieval system, in combination, a plurality of side-by-side magazines, each storing a plurality of coded cards, the coding of said cards comprising notches formed in one edge of the cards; and a selection system common to said plurality of magazines for selecting any card in any magazine, said system comprising a group of selector bars adjacent to the notched edges of the cards in the magazines, extending substantially perpendicularly to said edges and having a length such that the bars reach all cards in said plurality of magazines, and means coupled to said bars for changing the positions thereof to effect the selection of a card.

32. The system of claim 31, further including means including said selector system for causing one card in one magazine partially to extend from said magazine; and a card ejecting element common to said plurality of magazines for engaging said one card and ejecting it from said magazine.

33. The system of claim 32, wherein each magazine is formed with an opening therein which lies in a plane perpendicular to the coded edge of the cards therein, wherein said card ejecting element extends in the same direction as the selector bars, and further including means for moving said element in a direction parallel to the notched edge of a card for ejecting said one card through said opening in its magazine.

34. In an information storage and retrieval system, in combination, a plurality of magazines, each storing a plurality of information storage cards, a read-write station for said cards; a recirculate card transport path coupled to said station; and a card transport system common to said plurality of magazines for moving a selected card from a magazine to said station, recirculating the card through said recirculate card transport path a desired number of times, and then returning the selected card to its magazine.

35. In an information storage and retrieval system, in combination, a plurality of magazines, each storing a plurality of cards coded with magnetic material, said cards being formed with code notches at their lower edge; means including a plurality of selector bars common to all of said magazines for causing a desired card partially to extend from its magazine; card ejector means common to said plurality of magazines for engaging the portion of said desired card which extends from said magazine for ejecting said card from said magazine; a read-write station; and a card transport system common to said plurality of magazines for moving the card ejected from said magazine to said station and returning it to said magazine.

36. In an information storage and retrieval system, in combination, a hollow magazine having first and second parallel side walls, a first opening lying in a plane perpendicular to said two walls and having a length substantially equal to that of said two walls, and second and third openings lying in planes perpendicular to said two walls and to the plane of said first opening and located at opposite ends of the magazines; a plurality of cards in said magazine arranged parallel to said side walls; means operatively associated with said magazine for causing a portion of one card to extend from said first opening; and means for engaging said portion of said one card for ejecting said card from the magazine through said second opening.

37. In an information storage and retrieval system, in combination, a hollow magazine having first and second parallel side walls, a first opening lying in a plane perpendicular to said two walls and having a length substantially equal to that of said two walls, and second and third openings lying in planes perpendicular to said two walls and to the plane of said first opening and located at opposite ends of the magazine; a plurality of cards in said magazine arranged parallel to said side walls; means operatively associated with said magazine for causing a portion of one card to extend from said second opening; means for engaging said portion of said one card for ejecting said card from the magazine through said second opening; and means for returning said one card to said magazine through said third opening.

38. In an information storage and retrieval system, in combination, a pack of information storage cards; a magazine in which said pack of cards is located, said magazine being formed with a first opening adjacent to one edge of the cards and a second opening adjacent to another edge of the cards; means operatively associated with the magazine for selecting one card in the pack and causing it partially to extend through said first opening in said magazine; and means positioned adjacent to the first opening for engaging the portion of the card extending through the first opening and propelling it in a direction parallel to the card surface for ejecting the card from said second opening in said magazine.

39. In a random access storage and retrieval system, in combination: a stack of aligned, planar storage means, one of the edges of each said storage means being provided with notches arranged in an identifying code uniquely identifying each storage means by the position of the notches therein; address means positionable in accordance with said identifying code for uniquely addressing one of said storage means; means for effecting relative movement between said stack and said address means to engage the address means with the notched edges of said storage means; and means for engaging said uniquely addressed storage means at at least one of its edges and for withdrawing the same, in its entirety, from said stack.

40. In a random access storage and retrieval system, in combination: a stack of aligned, planar storage means, each storing pictorial information, one of the edges of each said storage means being provided with notches arranged in an identifying code uniquely identifying each storage means by the position of the notches therein; address means positionable in accordance with said identifying code for uniquely addressing one of said storage means; means for effecting relative movement between said stack and said address means to engage the address means with the notched edges of said storage means; a viewing station including a storage means viewing position, means for shining light through a storage means when the latter is in said viewing position, and image receiving means receptive of light passing through a storage means when the latter is in said viewing position; means for engaging said uniquely addressed storage means and withdrawing it, in its entirety, from said stack; and means receptive of said withdrawn storage means for locating it in said viewing position.

41. In a random access storage and retrieval system, in combination: a stack of aligned, planar storage means, one of the edges of each said storage means being provided with notched arranged in an identifying code uniquely identifying each storage means by the position of the notches therein; address means comprising a plurality of elongated bars in substantially edgewise relationship to the notched edges of said stack of storage means and positionable in accordance with said identifying code for uniquely addressing one of said storage means; means for effecting relative movement between said stack and said address means to engage said elongated bars with the notched edges of said storage means; and withdrawal means for engaging said uniquely addressed storage means and for withdrawing the same, in its entirety, from said stack.

42. In a random access storage and retrieval system as set forth in claim 41, each said planar storage means storing pictorial information which can be read from said storage means by shining light therethrough, and further including: a station at which the information stored on the withdrawn storage means may be viewed, said station including means for projecting light; means receptive of the withdrawn storage means for locating the same at said station in the path of such projected light; and a viewing screen for receiving the light passing through said withdrawn storage means when the latter is located at said viewing station.

43. In a random access storage and retrieval system, a stack of aligned, planar information storage means, each storing picture information in the form of a film transparency, one of the edges of each said storage means being provided with notches arranged in an identifying code uniquely identifying each storage means by the position of the notches therein, the presence of a notch in alternate positions representing the zero and one bits of binary coding; elongated address bars in substantially edgewise relation with the coded edge of said stack and positionable in either of two positions likewise corresponding to binary zero and one bits; means for effecting relative movement between the stack and said address bars to selectively engage the address bars in the notches of a particular one of said storage means, for locating said one storage means in a different position than the remaining storage means; means for engaging said particular one of said storage means and for effecting removal thereof from said stack; a station at which the information stored on the removed storage means may be viewed, said station including means for projecting light; means receptive of the removed storage means for locating the same at said station in the path of said projected light; and a viewing screen for receiving the light passing through a storage means located at said station.

References Cited

UNITED STATES PATENTS

| | | | |
|---|---|---|---|
| 2,918,656 | 12/1959 | Nolde et al. | 340—173 |
| 3,060,413 | 10/1962 | Parks | 340—174.1 |

DARYL W. COOK, *Primary Examiner.*

UNITED STATES PATENT OFFICE
CERTIFICATE OF CORRECTION

Patent No. 3,394,247 July 23, 1968

Eugene H. Irasek

It is certified that error appears in the above identified patent and that said Letters Patent are hereby corrected as shown below:

Column 14, line 68, "lodged" should read -- lodging --. Column 18, line 72, "notched" should read -- notches --.

Signed and sealed this 30th day of December 1969.

(SEAL)
Attest:

Edward M. Fletcher, Jr.
Attesting Officer

WILLIAM E. SCHUYLER, JR.
Commissioner of Patents